US011483070B2

(12) United States Patent
Roberts

(10) Patent No.: US 11,483,070 B2
(45) Date of Patent: Oct. 25, 2022

(54) SYSTEMS, METHODS, AND DEVICES FOR INFRARED COMMUNICATIONS

(71) Applicant: Eric Clifton Roberts, Tyler, TX (US)

(72) Inventor: Eric Clifton Roberts, Tyler, TX (US)

(*) Notice: Subject to any disclaimer, the term of this patent is extended or adjusted under 35 U.S.C. 154(b) by 0 days.

(21) Appl. No.: 17/327,687

(22) Filed: May 22, 2021

(65) Prior Publication Data

US 2022/0182142 A1 Jun. 9, 2022

Related U.S. Application Data

(60) Provisional application No. 63/121,345, filed on Dec. 4, 2020.

(51) Int. Cl.
*H04B 10/112* (2013.01)
(52) U.S. Cl.
CPC .................................. *H04B 10/112* (2013.01)
(58) Field of Classification Search
None
See application file for complete search history.

(56) References Cited

U.S. PATENT DOCUMENTS

| 8,050,863 | B2* | 11/2011 | Trepagnier ........... G05D 1/0274 340/436 |
| 9,541,634 | B2 | 1/2017 | Beall et al. |
| 9,621,266 | B2* | 4/2017 | Breuer ................ H04B 10/502 |
| 9,756,706 | B2* | 9/2017 | Breuer ................... H05B 47/11 |
| 9,804,257 | B2 | 10/2017 | Pusch et al. |
| 9,948,391 | B2* | 4/2018 | Breuer ............... H04B 10/1149 |
| 10,095,928 | B2 | 10/2018 | Beall et al. |
| 10,178,506 | B2* | 1/2019 | Breuer ................. H04B 10/116 |
| 10,231,791 | B2 | 3/2019 | LeBoeuf, II et al. |
| 10,378,897 | B2* | 8/2019 | Jovicic ................. G01C 21/206 |
| 10,484,091 | B2* | 11/2019 | Stout ..................... H04B 10/114 |
| 10,630,384 | B2* | 4/2020 | Plank ....................... G01S 17/88 |
| 10,846,940 | B1 | 11/2020 | McIntyre, Jr. et al. |
| 10,958,341 | B2* | 3/2021 | Daoud .................... H04W 4/33 |
| 11,176,512 | B2* | 11/2021 | Siris ....................... G06Q 10/08 |
| 2018/0196139 | A1* | 7/2018 | Brown ..................... G01S 17/10 |
| 2019/0212752 | A1 | 7/2019 | Fong et al. |
| 2019/0305846 | A1* | 10/2019 | Kido ..................... H04B 10/116 |
| 2019/0320061 | A1 | 10/2019 | Salandy-Defour et al. |
| 2020/0217666 | A1 | 7/2020 | Zhang et al. |
| 2021/0325505 | A1* | 10/2021 | Cincotta ................... G01S 5/16 |

* cited by examiner

*Primary Examiner* — Jai M Lee
(74) *Attorney, Agent, or Firm* — Chong IP Law Group

(57) ABSTRACT

Systems, methods, and devices for infrared (IR) communications in accordance with embodiments of the invention are disclosed. In one embodiment, a first infrared (IR) device configured for real time mapping comprises: a mapping module; a communication module; an IR receiver configured to receive an IR signal transmitted from at least one second IR device; a processor operatively connected to the mapping module, communication module, and IR receiver; and memory storing a program comprising instructions that cause the first IR device to: capture map data using the mapping module; transmit a request for an IR signal using the communication module; scan for IR signals using the IR receiver; receive an IR signal, from the at least one second IR device, using the IR receiver; and validate the at least one second IR device to a location by mapping the received IR signal to a position on the map data.

22 Claims, 15 Drawing Sheets

SYSTEMS, METHODS, AND DEVICES FOR INFRARED COMMUNICATIONS

CROSS-REFERENCE TO RELATED APPLICATION

The current application claims priority to U.S. Provisional Patent Application No. 63/121,345, filed on Dec. 4, 2020, the disclosure of which is incorporated herein by reference.

FIELD OF THE INVENTION

The present invention generally relates to wireless communications specifically to systems, methods, and devices for infrared (IR) communications.

BACKGROUND

Infrared (IR) (may also be referred to as "IR light") may include electromagnetic radiation with wavelengths longer than those of visible light. Typically, IR is invisible to the human eye, although IR at wavelengths up to 1050 nm from specially pulsed lasers may be seen by humans under certain conditions. Generally, IR wavelengths extend from the nominal red edge of the visible spectrum at 700 nanometers (frequency 430 THz) to 1 millimeter (300 GHz). Most of the thermal radiation emitted by objects near room temperature may be infrared. IR may carry radiant energy and may behave both like a wave and like its quantum particle, the photon.

SUMMARY OF THE INVENTION

The various embodiments of the present IR communication systems have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that many devices (e.g., robots, smart devices, wireless devices, wearables, driver-less vehicles, unmanned aerial vehicles (UAVs) etc.) may possess limited means and/or accuracy at defining and/or authenticating device identities along with exact locations of other objects, therefore may have issues navigating to and/or interacting efficiently and effectively. Various technology fields may be enhanced by augmenting and providing such devices with the ability to see, navigate, and/or communicate using IR communications. Some applications may already communicate with each other; however, the devices may not readily identify (and/or have technology to validate identity of) one another without having to be close enough in proximity for other prevalent technologies to work effectively. For example, such devices may need to scan each other's radio-frequency identification (RFID), scan code, and/or have touch confirmation. Further, having multiple devices in a single location may reduce a system's ability to identify the various devices. For example, if 1000 Bluetooth, WiFi, cellular, etc. devices are placed in a room, it may be extremely difficult for any of them to identify where each other is. Such devices may be able to recognize that each other exists in a space and some may even recognize that one device is different from the another, but such devices may fail the task of authentication of identify and/or location efficiently and/or effectively if kept out of a close proximity or near-field communication distance away from each other. The present embodiments further include the realization that imaging may be utilized for identification and/or location tasks. The IR communication systems provide for a unique ability for devices to expand communication and readily identify each other in real space and in line of sight ("LOS"). The IR communication systems may allow for additional features by allowing devices the ability to quickly recognize and/or track each other in real space in line of sight and interact and communicate and/or perform tasks more efficiently and effectively by utilizing the unique sight driven data transmission of IR. For example, there may be many devices in a given space, and while the devices will be viewable to each other, there will be no visual pollution or other harmful effects to humans. Further, IR communication systems may provide for the ability to readily connect and determine identity and track movement. For robots, driver-less vehicles, and the like, the IR communication system may enhance decision navigation and/or direction making protocols that authenticate identity of desired objects while confirming and/or tracking location. Further, the integrated communication systems may also potentially provide for job status, validation of tasks, and/or reduce risks and/or assumptions as may be associated to 1-way communication systems. When a driver-less object or robot starts up, such a device may need a destination, a mode/means to get to the destination, identify its target location for the task with correct orientation and/or alignment, a task to complete when the device gets to the target location, and confirmation that the task was completed. IR communications may provide solutions and/or provide enhancements to solving such objectives.

In another aspect, an IR communication system may include an IR signal transmission that may be superimposed on a 2D field of view for augmented reality, as further described below. For example, an IR communication system may include a first IR device configured to receive an IR signal, but that first IR device may not need to identify a specific device (e.g., an equipment and/or unit) device that the first IR device is viewing. In such embodiments, the first IR device may receive a signal/message (e.g., an IR signal) from an IR transmitter (e.g., a second IR device) and be able to filter/focus on the source of a specific IR transmission and receive a message that it may perform a function and/or process in reaction to being able to read the IR signal and associate it to a tracked 2D location on a field of view. In many embodiments, the first IR device may include a camera that may be configured to capture image data (may also be referred to as "map data") over a field of view and filter for desired frequencies of light that may be associated and compatible for use in an IR device. In various embodiments, the first IR device may specifically look for smaller and higher amplitude, specific frequencies, and/or wavelength ranges/bands of IR signals that may be desired for message purposes and filter out the rest. In some embodiments, the camera may receive message(s) that may be associated with a tracked 2D direction relative to the field of view of the camera. In various embodiments, IR communication systems may include communication protocols such as (but not limited to) modulating (e.g., rapidly pulsing on/off, binary code, etc.), amplitude variances of a specific frequency of light, etc. In some embodiments, the camera may sense frequency signals and translate and/or demodulate the frequency signals into some predefined language and/or data for use by the first IR device. In some embodiments, an alternative may be to use TVR (TV remote), IrDA (Infrared Data Association), or similar signal types. In some embodiments, first IR devices may collect light over a field of view through a lens, filter for IR, spread over an IR receiver array, and transmit data to a processor to convert to an electrical signal and/or data, and the processor may further filter and/or refine the electrical signal, as further described below.

In another aspect, an IR communication system may include an IR signal transmission that may be superimposed on a 3D field of view for augmented reality and location tracking, navigation, etc. For example, a first IR device may include a 3D imaging device (e.g., a LIDAR device, 3D camera system, etc.). Using such 3D viewing enabled devices, a 3D map of surfaces in a field of view may be created and refreshed in real time. In some embodiments, the first IR device may also include a camera that may be orientated to capture an overlapping field of view. In some embodiments, the camera may be configured for light filtering capabilities that may use filtering to find and define a specific light or IR frequency to be received within the camera's field of view. In various embodiments, IR and/or other desired light spectrums may be identified and superimposed onto the 3D map or electronically associated with a 3D space. Thus, a second IR device that transmits an IR signal (or other light signal) may be associated with a unique 3D location that may be tracked by following that localized frequency of light.

In another aspect, an IR communication system may utilize a direct wireless communication (may also be referred to as "secondary communication") while using IR signals for validation on 2D and/or 3D field of view for augmented reality and location tracking, navigation, complex communication needs, etc. For example, the IR signal may be used for discovery and location tracking once the IR devices (e.g., a first and a second IR device) are within a communication range via a secondary communication protocol (e.g., GPS, Bluetooth, cellular, WiFi, WLAN, etc.). In some embodiments, once the IR devices have passed one or more protocol(s) to link and communicate via the secondary communications, the IR receiving device (e.g., a first IR device) may request and/or scan for an IR signal from the IR transmitting device (e.g., a second IR device). In many embodiments, the IR signal may also be unique and derived such as (but not limited to) a coded signal, an authentication feedback communication, etc. In some embodiments, the IR signal may be automatically generated or a unique code such as (but not limited to) a serial number that is specific to the second IR device. In some embodiments, the IR receiving device (e.g., the first IR device) may search, find, and/or track the specific IR transmitting device (e.g., the second IR device). In such embodiments, the first IR device may perform various functions, processes, and/or tasks over the secondary communication protocol (e.g., a complex and high data rate wireless communication protocol) with confidence knowing where the second IR device is in real space for LOS applications of the first IR device.

In another aspect, an IR communication system may utilize a direct wireless communication while using the IR communication for validation on a 2D and/or a 3D field of view for augmented reality and location tracking, navigation, complex communication needs, etc., as described above. In some embodiments, the first IR device may include a 3D scanning device (e.g., a LIDAR device), as further described above. Further, the first IR device may also include a camera orientated to capture an overlapping field of view as the LIDAR, as further described above. In many embodiments, a location associated with the second IR device may be identified and superimposed onto the 3D map or electronically associated with a 3D space (e.g., a tracked 3D coordinate and/or location, etc.), as further described above. In some embodiments, such an IR communication system may utilize one or more IR receivers (e.g., the first IR devices) that may be shielded via conductive metal to a narrow field of view to one or some small cluster of pixels on the filtered camera data. Further, the IR receiver(s) (e.g., the first IR device(s)) may include controls such that the first IR device(s) may pivot and tilt to focus on a tracked location of the unique light frequency that the camera may be tracking. In this way, a unique and desired IR transmitter (e.g., a second IR device) may be found and superimposed in real space or associated to a 3D space, and receive full data transmission capabilities of IR (and/or light) signals for communication. In some embodiments, gyroscopic controls/balancing may be utilized to maintain focus of the first IR device(s). In some embodiments, as an alternative to the one first IR device and IR communication systems, an IR communication system may be configured to collect light over a field of view through one or more lens, filter for IR, and spread over an IR receiver array. In such embodiments, a processor of one or more first IR devices (or a server), may convert IR data to one or more electrical signals, further filter and refine the electrical signals, as further described below. In some embodiments, a first IR device may continually read an IR signal associated with a second IR device regardless of how either IR devices maneuver as long as LOS was not interrupted. These and other aspects and advantages of the present embodiments are described in further detail below.

In a first aspect, a first infrared (IR) device configured for real time mapping is provided, the first IR device comprising: a mapping module having a field of view; a communication module; an IR receiver configured to receive an IR signal transmitted from at least one second IR device; a processor operatively connected to the mapping module, the communication module, and the IR receiver; and memory storing a program comprising instructions that, when executed by the processor, cause the first IR device to: capture map data of the field of view using the mapping module; transmit a request for an IR signal using the communication module; scan for IR signals using the IR receiver; receive an IR signal, from the at least one second IR device, using the IR receiver; and validate the at least one second IR device to a location by mapping the received IR signal to a position on the map data.

In an embodiment of the first aspect, the program comprises further instructions that, when executed by the processor, further cause the first IR device to scan for IR signals within a predetermined response time window.

In another embodiment of the first aspect, the program comprises further instructions that, when executed by the processor, further cause the first IR device to validate the at least one second IR device to a location by comparing the received IR signal for a match of the requested IR signal.

In another embodiment of the first aspect, the request for the received IR signal comprises a unique identifier that identifies the at least one second IR device.

In another embodiment of the first aspect, the program comprises further instructions that, when executed by the processor, further cause the first IR device to determine the at least one second IR device's orientation and speed using the map data and the received IR signal.

In another embodiment of the first aspect, the program comprises further instructions that, when executed by the processor, further cause the first IR device to use GPS data to further refine the map data.

In another embodiment of the first aspect, the program comprises further instructions that, when executed by the processor, further cause the first IR device to initiate secondary wireless communication with the at least one second IR device using the communication module.

In another embodiment of the first aspect, the program comprises further instructions that, when executed by the processor, further cause the first IR device to transmit the map data to a server.

In another embodiment of the first aspect, the program comprises further instructions that, when executed by the processor, further cause the first IR device to generate augmented reality (AR) data using the received IR signal and the map data, wherein the AR data indicates a location of the at least one second IR device in relationship to the map data.

In another embodiment of the first aspect, the mapping module comprises a camera and the mapping data comprises 2D image data.

In another embodiment of the first aspect, the mapping module comprises a Light Detection and Ranging (LIDAR) device and the mapping data comprises 3D data.

In a second aspect, a system for infrared (IR) communications is provided, the system comprising: a first IR device comprising a mapping module and an IR receiver, wherein the first IR device is configured to: capture map data of the field of view using the mapping module; receive IR signals within a line of sight (LOS); associated the received IR signals to a location on the LOS and map the location of the signal on to the map data; scan for and receive compatible IR signals and generate augmented reality (AR) data using the received compatible IR signals and the map data; and at least one second IR device comprising an IR transmitter, wherein the at least one second IR device is configured to transmit the IR signal using the IR transmitter.

In an embodiment of the second aspect; the first IR device and the at least one second IR device further comprise a communication module for wireless communication between the first IR device and the second IR device.

In another embodiment of the second aspect; the second IR device is configured to transmit location data to the first IR device using the communication module.

In another embodiment of the second aspect; the first IR device is configured to transmit, using the communication module, a request for an IR signal, to the at least one second IR device and receive, using the IR receiver, an IR signal from the at least one second IR device.

In another embodiment of the second aspect; the first IR device is configured to validate the at least one second IR device to a location by mapping the received IR signal to a position on the map data and comparing the received IR signal for a match of the requested IR signal.

In another embodiment of the second aspect; the received IR signal comprises a unique identifier that identifies the at least one second IR device.

In another embodiment of the second aspect; the first IR device and the at least one second IR device each further comprises a communication module for secondary wireless communication and the first IR device transmits navigation instructions to the at least one second IR device using the secondary wireless communication.

In another embodiment of the second aspect; the first IR device is configured to convert the IR signal to consumable information.

In another embodiment of the second aspect; the at least one second IR device comprises a camera configured to capture camera data and the at least one second IR device is configured to filter the camera data to isolate compatible requested IR signals and assigning the compatible requested IR signals on the camera data.

In another embodiment of the second aspect; the at least one second IR device comprises a 3D imaging device and the at least one second IR device is configured to determine a location of the first IR device in 3D space.

In another embodiment of the second aspect; the at least one second IR device comprises an IR receiver array, and the at least one second IR device is configured to receive the requested IR signal and associate the requested IR signal to a location by filtering for a compatible requested IR signal on the IR receiver array, wherein each IR receiver of the IR receiver array correlates to a location on a field of view of the at least one second IR device.

BRIEF DESCRIPTION OF THE DRAWINGS

The various embodiments of the present IR communications now will be discussed in detail with an emphasis on highlighting the advantageous features. These embodiments depict the novel and non-obvious IR communication systems, methods, and/or devices (may be referred to collectively as "IR communication systems") shown in the accompanying drawings, which are for illustrative purposes only. These drawings include the following figures.

DETAILED DESCRIPTION OF THE DRAWINGS

Figure 1:
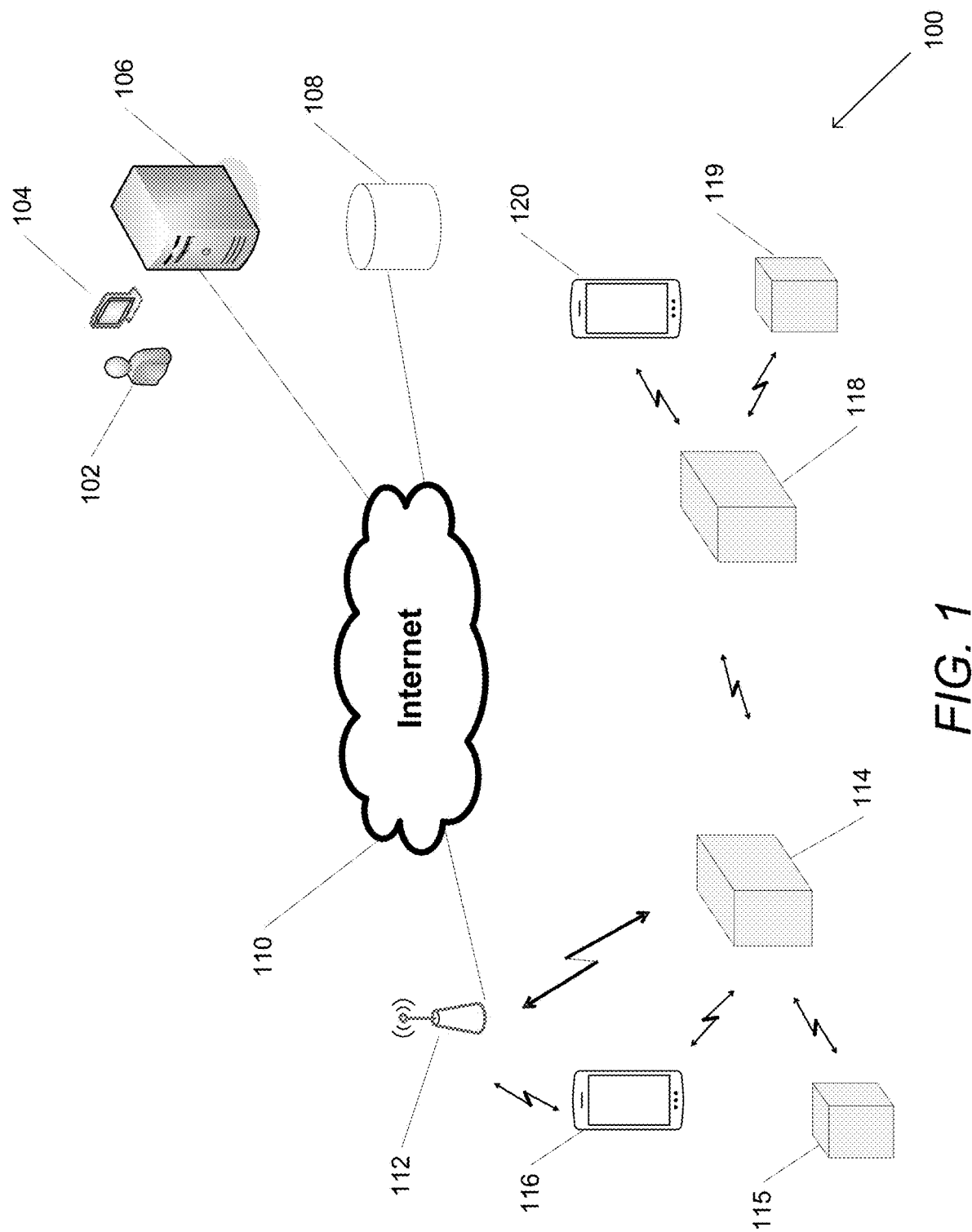
FIG. 1 is a block diagram illustrating a system for IR communications in accordance with an embodiment of the invention.

The following detailed description describes the present embodiments with reference to the drawings. In the drawings, reference numbers label elements of the present embodiments. These reference numbers are reproduced below in connection with the discussion of the corresponding drawing features.

The embodiments of the present IR communication systems are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

Turning now to the drawings, systems and methods for IR communications to distinguish devices (may also be referred to as "IR devices"), locate and track IR devices, and/or communicate between IR devices, are described herein. In many embodiments, IR communication systems may utilize LOS (or near LOS) properties for data communication between devices. Further, IR devices may be a network of interconnected devices that may improve LOS ranges. For example, an IR communication network may include many networked IR devices throughout a space or facility. In many embodiments, IR devices, such as (but not limited to) first and/or second IR devices, may be attached to other products, objects, persons, robots, automotive equipment, UAV's, etc. and may be integral to them or separate from them. In some embodiments, the second IR device may be configured to capture and/or generate identifying information about the second IR device (or a device that the second IR device may attached to or a part of). In many embodiments, the second IR device may transmit an IR signal that may be received by a first IR device. In some embodiments, the IR signal may utilize amplification, signal processing, and/or be converted from an optical to an electrical signal. In various embodiments, the first IR device may include one or more mapping modules (e.g., LIDAR device, camera, etc.) and be configured to capture mapping information regarding its surroundings (e.g., map data). Further, the first IR device may be configured to receive the IR signal and perform various functions, as further described below. For example, in some embodiments, the first IR device may be configured to integrate the IR data (may also be referred to as "IR signal") with the mapping information to measure direction and distance, tracked motion and movement, etc. In many embodiments, IR device location tracking may also be used to aid communication via gesturing and/or signaling. Communication systems utilizing IR devices in accordance with embodiments of the invention are further described below.

IR Communication Systems

IR communication systems may utilize IR technology (e.g., LOS technology) or near LOS technology for communication. In many embodiments, data communication may be conducted between the two IR devices (e.g., a first IR device and a second IR device) that may be within LOS of each other. In various embodiments, IR devices may be configured in a network of interconnected devices via a common control and/or data network system that may improve beyond LOS ranges in large environments. In some embodiments, many networked IR devices may be placed throughout a space or facility. In various embodiments, IR communication systems may be configured to allow for transmitting an IR signal to uniquely identify an IR device (e.g., a second IR device), transmit message(s), interact with various secondary devices and client devices from a simple IR transmission device (e.g., a second IR device).

A block diagram illustrating a system for IR communications in accordance with an embodiment of the invention is shown in FIG. 1. The system 100 may include one or more server(s) 106 in network communication with at least one first IR device 114 for locating and/or tracking at least one second IR device 118, as further described below. In many embodiments, one or more user(s) 102 may access the server 106 using a graphical user-interface 104. In some embodiments, the server 106 may be in network communication with one or more database(s) 108 for storing various data gathered by the at least one first IR device 114, second IR device 118, and/or any other related data to IR communications. For example, the database 108 (and/or the server 106) may access the Internet 110 to gather data such as (but not limited to) geographic data, spatial data, floor plans, building/structure plans, road plans, etc.

In reference to FIG. 1, the second IR device 118 may comprise at least one IR transmitter configured to produce an IR signal, as further described below. For example, the IR signal may be a unique and distinguishing signal, such as (but not limited to) a unique identifier, codded signal, and/or authentication. In some embodiments, the IR signal may utilize existing communication types such as (but not limited to) IrDA (Infrared Data Association), TVR (TV remote), a binary or analog signal type that may be uniquely coded and/or translated to an existing software language. In various embodiments, the IR transmitter may be repeating, on/off, and/or software driven.

In further reference to FIG. 1, the first IR device 114 may be configured to scan for and receive one or more IR signal(s), as further described below. In some embodiments, the first IR device 114 may be configured to process and/or filter out an IR signal to determine whether the IR signal contains capable and/or compatible data for the first IR device 114. For example, in many embodiments, the IR signal may be utilized for positive and secure identification. Further, the first IR device 114 may have mapping capabilities, including (but not limited to) 2Dimensional (2D) or 3Dimensional (3D) capabilities, as further described below. For example, the first IR device 114 may include a Light Detection and Ranging (LIDAR) device, IR device, Laser device, Light Detector (e.g., camera(s)), and/or any other detector(s), or array of detector(s) or technology that may be capable of scanning and distinguishing IR. For example, the first IR device may be configured for environment scanning and/or distance measurement, using Ultrasonic, IR, Laser, LIDAR, Time of Flight (TOF), etc. As further described below, the first IR device 114 may distinguish IR signal(s) and determine distance and/or location of the source of the IR signal (i.e., the second IR device). Further, the first IR device 114 may integrate the data from or generated using the IR signal into a 3D (or 2D) data, Global Positioning System (GPS), and/or other coordinate system that may be integrated with a smart device or available to the first IR device by the Internet or any other connection to the first IR device 114. In some embodiments, the first IR device 114 may transmit the data (e.g., the IR data) to the server 106, and the server 106 may perform one or more functions, instead of or in connection with, the first IR device 114.

In further reference to FIG. 1, the at least one first and/or second IR device(s) 114, 118 may be configured to communicate with other components of the system 100 via a wired or wireless connection to connect to the Internet 110. For example, the at least one first and/or second IR device(s) 114, 118 may connect to the Internet 110 via Wi-Fi or a cellular data network 112 (i.e., wireless gateway). In some embodiments, the at least one first and/or second IR device(s) 114, 118 may connect to the Internet 110 using a low-power wide-area network (LPWAN) designed to allow long range communications at a low bit rate among connected objects, such as the various sensors of the at least first and/or second IR device(s) 114, 118.

In further reference to FIG. 1, the at least one first and/or second IR device(s) 114, 118 may be configured using client device(s) 116, 120, respectively. In various embodiments, the client device(s) 116, 120 may connect to and configure with the at least one first and/or second IR device(s) 114, 118 via a wired or wireless connection. For example, in some embodiments, the client device(s) 116, 120 may connect directly to the at least one first and/or second IR device(s) 114, 118 via a wireless protocol such as (but not limited to) Bluetooth or via Wi-Fi or the wireless gateway. In some embodiments, the at least one first and/or second IR device(s) 114, 118 may be configured directly with one or more interfaces (e.g., button, switch, touch face, etc.) located on or within the first and/or second IR device(s) 114, 118.

In further reference to FIG. 1, the IR communication system 100 may also include a first secondary device 115 in communication with the first IR device 114 and/or a second secondary device 119 in communication with the second IR device 118. In many embodiments, the first IR device 114 and/or the second IR device 118 may be configured for wireless communication (beyond IR communications) that may enhance ability to communicate. In many embodiments, such LOS wireless technologies may be utilized for enhanced communication between first and second IR devices 114, 118 and any type of secondary devices 115, 119 such as (but not limited to) camera(s), image or voice/sound recorder(s)/transmitter(s), scanner(s), laser, thermal(s), etc. In some embodiments, unique markings and/or RFIDs may be utilized to aid in alignments and/or engagement of various devices. In some embodiments, interactions between first and/or second IR devices 114, 118 may be communicated back to cooperative products and/or secondary devices 115, 119. In various embodiments, first and second secondary devices 115, 119 may also perform processes and/or interactions performed between the first IR device 114 and the second IR device 118, as further described below. In some embodiments, groupings or plurality of first IR device(s) 114, second IR device(s) 118, first secondary device(s) 115, and/or second secondary device(s) 119 may be in network communication to have common functionality, information sharing, and/or conduct SWARM communication protocols that would also functionally include the advanced IR technology that may replace or be supplementary to the various devices, networks, processes, as described herein. In some embodiments, not all devices may need to be in the same LOS limitations that one device (e.g., first IR device 114) to another device (e.g., second IR device 118) may have. Instead, the various devices may communicate via a common network remotely or may be incorporated as a component of another device to have common knowledge/sharing capabilities.

In further reference to FIG. 1, confirmation of location of various devices and device data may be implemented. For example, in some embodiments, comparative logic may be utilized to confirm and/or distinguish between a plurality of second IR device(s) 118 within a LOS of a first IR device 114. Thus, the IR communication system 100 may have the ability to discover and filter to perform the identification and authentication/validation steps for multiple devices in the same LOS field. Further, since IR signal(s) may be communicated by a single IR source, authentication protocol should have a high degree of certainty and not be easily hacked.

In further reference to FIG. 1, first IR device(s) 114 and second IR device(s) 118 may each have a set of IR transmitter and set of IR receiver, such that IR communication may be bi-directional. In some embodiments, IR communications may include the use of the IR signals that can be re-transposed and/or networked for augmented reality or additive to virtual reality technology. In many embodiments, the IR communication system 100 may be configured for deliver job status, validation of tasks, and/or reduction of risks associated with 1-way communication of driver-less systems, robotic systems, and/or any other automated or semi-automated equipment systems.

In further reference to FIG. 1, in many embodiments, the system 100 may include a first IR device 114 that includes a mapping module and an IR receiver, where the first IR device 114 may be configured to capture map data of a field of view using the mapping module, as further described below. In some embodiments, the first IR device 114 may also be configured to receive IR signals within a line of sight (LOS) and associate the received IR signals to a location on the LOS and map the location of the signal on to the map data, as further described below. In some embodiments, the first IR device 114 may also be configured to scan for and receive compatible IR signals and generate augmented reality (AR) data using the received compatible IR signals and the map data. Further, the system 100 may also include at least one second IR device 118 comprising an IR transmitter, where the at least one second IR device 118 is configured to transmit the IR signal using the IR transmitter, as further described below.

In further reference to FIG. 1, in various embodiments, the first IR device 114 and the second IR device 118 may each include a communication module for wireless communication between the first IR device 114 and the second IR device 118. In some embodiments, the second IR device 118 may be configured to transmit location data to the first IR device 114 using its communication module. In some embodiments, the first IR device 114 may be configured to transmit, using the communication module, a request for an IR signal, to the second IR 118 device and receive, using the IR receiver, an IR signal from the second IR device 118. In some embodiments, the first IR device 114 may be configured to validate the second IR device 118 to a location by mapping the received IR signal to a position on the map data and comparing the received IR signal for a match of the requested IR signal. In some embodiments, the received IR signal may include a unique identifier that identifies the second IR device 118, as further described below. In addition, the first IR device 114 and the second IR device 118 each use their respective communication modules for secondary wireless communication and the first IR device 114 may transmit navigation instructions to the second IR device 118 using the secondary wireless communication. Further, the first IR device 114 may be configured to convert the IR signal to consumable information, as further described below.

In further reference to FIG. 1, in a variety of embodiments, the second IR device 118 may include a camera configured to capture camera data and the second IR device 118 may be configured to filter the camera data to isolate compatible requested IR signals and assign the compatible requested IR signals on the camera data. In some embodiments, the second IR device 118 may include a 3D imaging device and the second IR device 118 may be configured to determine a location of the first IR device 114 in 3D space. In some embodiments, the second IR device 118 may include an IR receiver array, and the second IR device may be configured to receive the requested IR signal and associate the requested IR signal to a location by filtering for a compatible requested IR signal on the IR receiver array, where each IR receiver of the IR receiver array may correlate to a location on a field of view of the second IR device 118.

Although specific IR communication systems using at least one first and second IR devices are discussed above with respect to FIG. 1, any of a variety of systems including a variety of first IR devices, second IR devices, client devices, secondary devices, and servers communicating using various communication protocols as appropriate to the requirements of a specific application can be utilized in accordance with embodiments of the invention. Various devices that may utilize IR signal(s) in accordance with embodiments of the invention are discussed further below.

Figure 2:
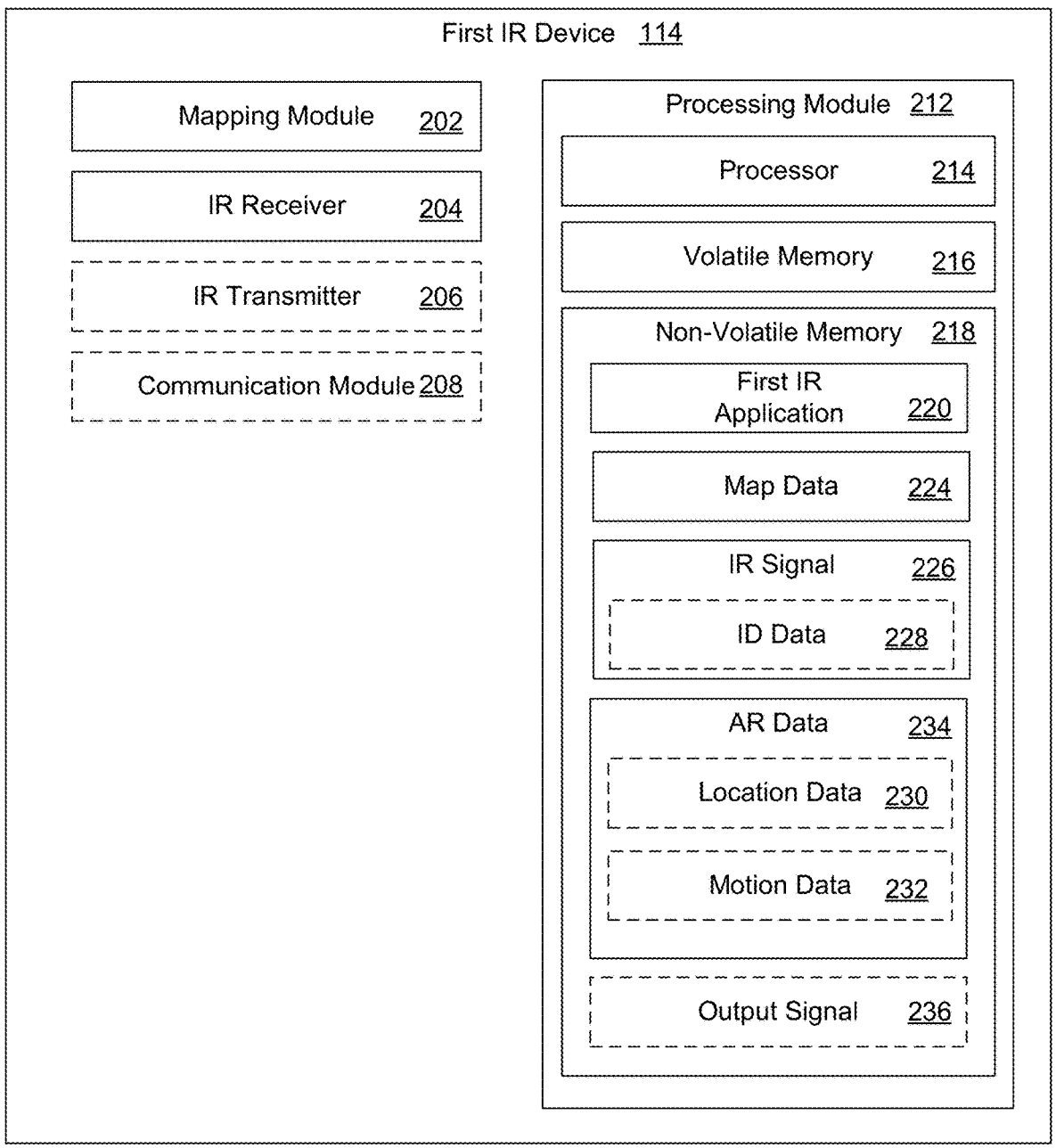
FIG. 2 is a block diagram illustrating a first IR device in accordance with an embodiment of the invention.

A block diagram illustrating a first IR device in accordance with an embodiment of the invention is shown in FIG. 2. The first IR device 114 may comprise a processing module 212 that is operatively connected to a mapping module 202 and an IR receiver 204. In many embodiments, the mapping module 202 may be a camera, a LIDAR device, or any other device capable of scanning and/or capturing data (e.g., map data 224) of a field of view. In various embodiments, the IR receiver 204 may be configured to receive an IR signal 226 from a second IR device 118, as described further below. In some embodiments, the mapping module 202 and the IR receiver 204 may be integrally formed as a single component. For example, in some embodiments, the mapping module 202 may be a camera configured to capture map data 224 and to receive the IR signal 226. In some embodiments, the processing module 212 may be operatively connected to a communication module 208, as further described below. In some embodiments, the processing module 212 may also be operatively connected to an IR transmitter 206. Although illustrated as separate components, one of ordinary skill would understand that the IR receiver 204 and the IR transmitter 206 may be a transceiver capable of both transmitting and receiving IR signals.

In reference to FIG. 2, the processing module 212 may comprise a processor 214, volatile memory 216, and non-volatile memory 218 that includes a first IR application 220. In various embodiments, the first IR application 220 may configure the processor 214 to locate and/or track the second IR device 118, as further described below. In some embodiments, the first IR application 220 may further configure the processor 214 to perform various functions such as (but not limited to) validating identity and/or location of a second IR device 118. In some embodiments, the first IR application 220 may further configure the processor 214 to communicate with a first secondary device 115 using the communication module 208, as further described above. In some embodiments, the first IR application 220 may further configure the processor 214 to initiate secondary wireless communications between the first IR device 114 and the second IR device 118 using the communication module 208, as further described below.

In further reference to FIG. 2, the IR signal 226 may include ID data 228 that provides identification information of a second IR device 118. In several embodiments, the first IR application 220 may configure the processor 214 to generate augmented reality ("AR") data 234 using the IR signal 226 and the map data 224, as further described below. In some embodiments, the AR data 234 may include location data 230 that indicates a location of the second IR device 118 in relationship to the map data 224, as further described below. In some embodiments, the AR data may also include motion data 232 that provides information about current movement and/or motion information of the second IR device 118, as further described below. In some embodiments, the first IR application 220 may further configure the processor 214 to transmit an output signal 236 to a first client device 116, a server 106, a first secondary device 115, etc., as further described below. In many embodiments, the output signal 236 may include the IR data 228, map data 224, and/or AR data 234, as further described below.

In further reference to FIG. 2, in many embodiments, the first IR device 114 may be configured for real time mapping. For example, the first IR device 114 may include a mapping module 202 having a field of view, a communication module 208, an IR receiver 204 configured to receive an IR signal 226 transmitted from at least one second IR device 118. In various embodiments, the non-volatile memory 218 may store a program 220 comprising instructions that, when executed by the processor 214, cause the first IR device 114 to capture map data 224 of the field of view using the mapping module 202. In some embodiments, the first IR device 114 may be configured to transmit a request for an IR signal using the communication module 208, scan for IR signals using the IR receiver 204, receive an IR signal 226, from the second IR device 118, using the IR receiver 204, and validate the second IR device 118 to a location by mapping the received IR signal 226 to a position on the map data 224 (may also be referred to as AR data 234), as further described below.

In further reference to FIG. 2, in several embodiments, the first IR device 114 may be configured to scan for IR signals within a predetermined response time window. Further, the first IR device 114 may be configured to validate the second IR device 118 to a location by comparing the received IR signal 226 for a match of the requested IR signal. In some embodiments, the requested IR signal and/or the received IR signal 226 may include a unique identifier 228 that identifies the second IR device 118. In some embodiments, the first IR device 114 may be configured to determine the second IR device's 118 orientation and speed using the map data 224 and the received IR signal 226. In various embodiments, the first IR device 114 may be configured to use GPS data to further refine the map data 224.

In further reference to FIG. 2, the first IR device 114 may be configured to initiate secondary wireless communication with the second IR device 118 using the communication module 208. In addition, the first IR device 114 may be configured to transmit the map data 224 to a server 106. In some embodiments, the first IR device 114 may be configured to generate AR data 234 using the received IR signal 226 and the map data 224, where the AR data 234 indicates a location 230 of the second IR device 118 in relationship to the map data 224. In some embodiments, the mapping module 202 may include a camera and the mapping data 224 may include 2D image data. In some embodiments, the mapping module 202 may include a Light Detection and Ranging (LIDAR) device 202 and the mapping data 224 comprises 3D data.

Figure 3:
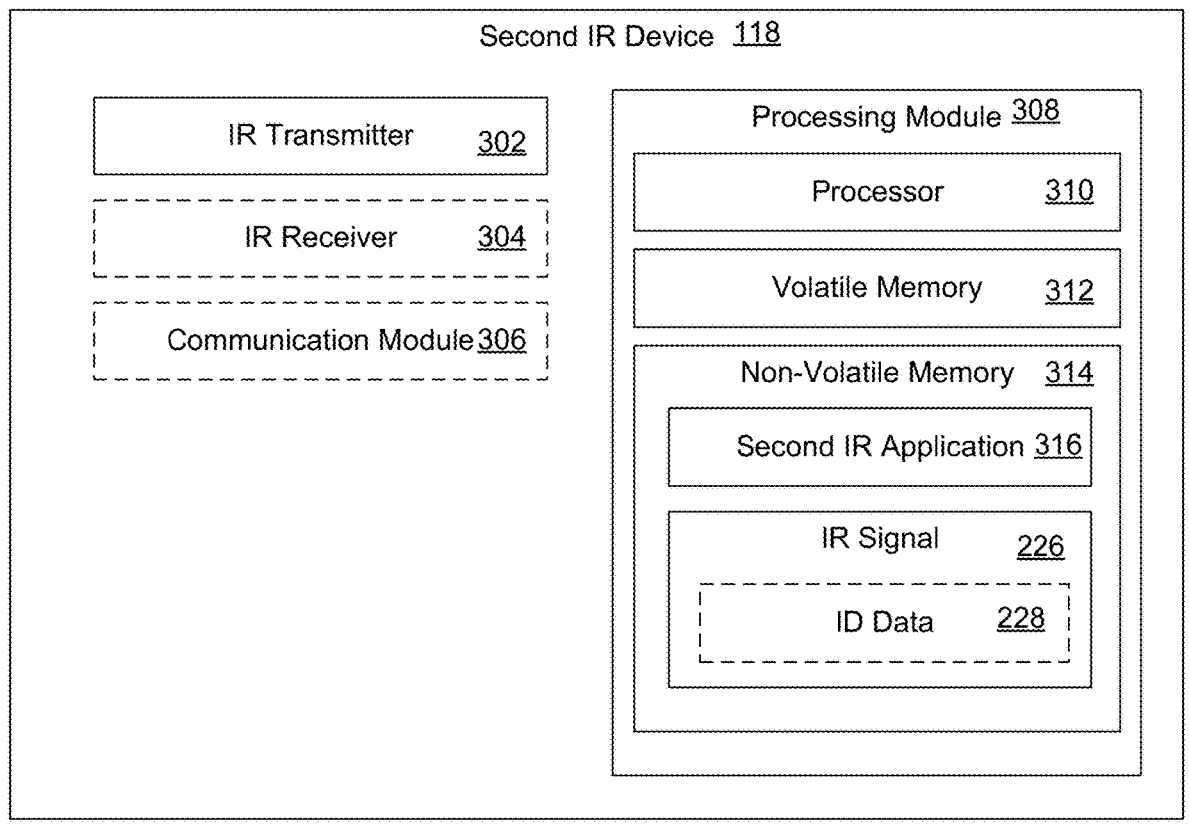
FIG. 3 is a block diagram illustrating a second IR device in accordance with an embodiment of the invention.

A block diagram illustrating a second IR device in accordance with an embodiment of the invention is shown in FIG. 3. The second IR device 118 may comprise a processing module 308 that is operatively connected to an IR transmitter 302. In some embodiments, the IR transmitter 302 may be configured to transmit an IR signal 226, as further described below. In several embodiments, the processing module 308 may be operatively connected to a communication module 306, as further described below. In some embodiments, the processing module 308 may also be operatively connected to an IR receiver 304. Although illustrated as separate components, one of ordinary skill would understand that the IR transmitter 302 and the IR receiver 304 may be a transceiver capable of both transmitting and receiving IR signals.

In reference to FIG. 3, the processing module 308 may comprise a processor 310, volatile memory 312, and non-volatile memory 314 that includes a second IR application 316. In some embodiments, the second IR application 316 may further configure the processor 310 to communicate with a second secondary device 119 using the communication module 306, as further described above. In various embodiments, the second IR device 118 may be associated with an object designated to be located and/or tracked. For example, the second IR device 118 may be associated with an object by physically attaching the second IR device 118 to the at least one object. In some embodiments, the second IR device 118 may be placed on, within, or in any other manner such that the second IR device 118 moves and stays connected to the object. Further, the non-volatile memory 314 may also store an IR signal 226 that may include ID data 228, as described above. However, the IR signal 226 may include any other information (i.e., data) such as (but not limited to) the second IR device's location (e.g., GPS coordinates, etc.), the second IR device's motion (e.g., orientation data), object information (e.g., package ID), shipping and/or end location information (e.g., shipment data), etc.

In reference to FIGS. 2 and 3, the map data 224 may comprise image sensor data such as (but not limited to) exposure values and data regarding pixel values for a particular sized grid. Further, map data may comprise converted image sensor data for standard image file formats such as (but not limited to) JPEG, JPEG 2000, TIFF, BMP, or PNG. In addition, map data may also comprise data related to video, where such data may include (but is not limited to) image sequences, frame rates, and the like. Moreover, map data may include data that is analog, digital, uncompressed, compressed, and/or in vector formats. Map data may take on various forms and formats as appropriate to the requirements of a specific application in accordance with the present embodiments. As described herein, the term "record" may also be referred to as "capture" as appropriate to the requirements of a specific application in accordance with the present embodiments.

Figure 4:
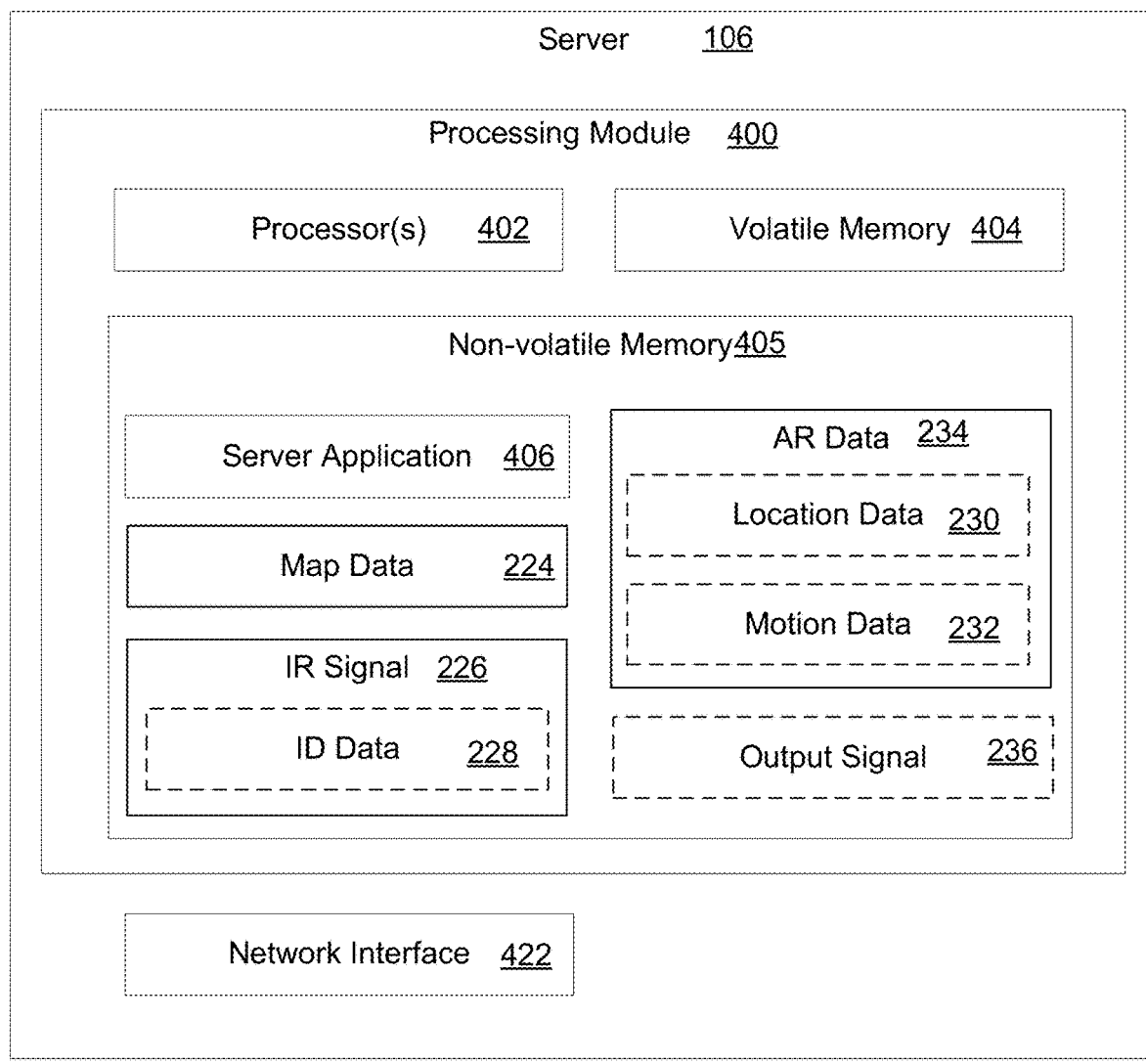
FIG. 4 is a block diagram illustrating a server in accordance with an embodiment of the invention.

A block diagram illustrating a server in accordance with an embodiment of the invention is shown in FIG. 4. The server 106 may comprise a processing module 400 including a processor 402, volatile memory 404, non-volatile memory 405, and a network interface 422. The network interface 422 may allow the server 106 to access and communicate with devices connected to the network (Internet/PSTN) 110. For example, the server 106 may receive an output signal 236 from a first IR device 114 that may include map data 224, IR data 226, AR data 234 (including location data 234 and/or motion data 232). In some embodiments, the server 106 may receive various data (e.g., map data 224, IR data 226 (including ID data 228), AR data 234 (including location data 230 and/or motion data 232) separately. In some embodiments, the server 106 may also receive data (e.g., IR data 226) directly from a second IR device 118.

In reference to FIG. 4, the non-volatile memory 405 may include a server application 406 that configures the processor 402 to locate and/or track objects (i.e., second IR device 118), as further described below. In various embodiments, the server 106 may perform processes in conjunction with or instead of the first IR device 114. For example, in some embodiments, the server application 406 may configure the processor 402 to receive the IR data 226 and map data 224 and generate the AR data 234. In many embodiments, the server 106 may access the network (Internet/PSTN) 110 to receive additional data from third party sources using the network interface 422.

In the illustrated embodiment of FIGS. 2-4, the various components including (but not limited to) the processing modules 212, 308, 400, the IR receivers 204, 304, the IR transmitters 206, 302, the communication modules 208, 306, mapping module 202, and the network interface 422 are represented by separate boxes. The graphical representations depicted in each of FIGS. 2-4 are, however, merely examples, and are not intended to indicate that any of the various components of the first IR device 114, the second IR device 118, or the server 106 are necessarily physically separate from one another, although in some embodiments they might be. In other embodiments, however, the structure and/or functionality of any or all of the components of the first IR device 114 may be combined. In some embodiments, the mapping module 202, IR receiver 204, IR transmitter 206, and/or communication module 208 may include its own processor, volatile memory, and/or non-volatile memory. Likewise, the structure and/or functionality of any or all of the components of the second IR device 118 may be combined. In some embodiments, the IR transmitter 302, IR receiver 304, and/or communication module 306 may include its own processor, volatile memory, and/or non-volatile memory. Moreover, the structure and/or functionality of any or all of the components of the server 106 may be combined. In addition, in some embodiments the network interface 422 may include its own processor, volatile memory, and/or non-volatile memory.

In further reference to FIGS. 2-4, a communication module, such as the communication modules 208, 306 may comprise (but is not limited to) one or more transceivers and/or wireless antennas (not shown) configured to transmit and receive wireless signals. In further embodiments, the communication modules 208, 306 may comprise (but are not limited to) one or more transceivers configured to transmit and receive wired and/or wireless signals. In addition, IR receivers and/or transmitters, such as the IR receivers 204, 304 and IR transmitters 206, 302, may comprise (but are not limited to) one or more IR transceivers and/or wireless antennas (not shown) configured to transmit and receive IR data, as described above.

Although specific IR devices including first and second IR devices and servers are discussed above with respect to FIGS. 2-4, any of a variety of devices using IR and various communication protocols as appropriate to the requirements of a specific application may be utilized in accordance with embodiments of the invention. Processes for locating tracking, validating, and/or communicating among and/or between IR devices in accordance with embodiments of the invention are discussed further below.

Processes for IR Devices

Figure 5A:
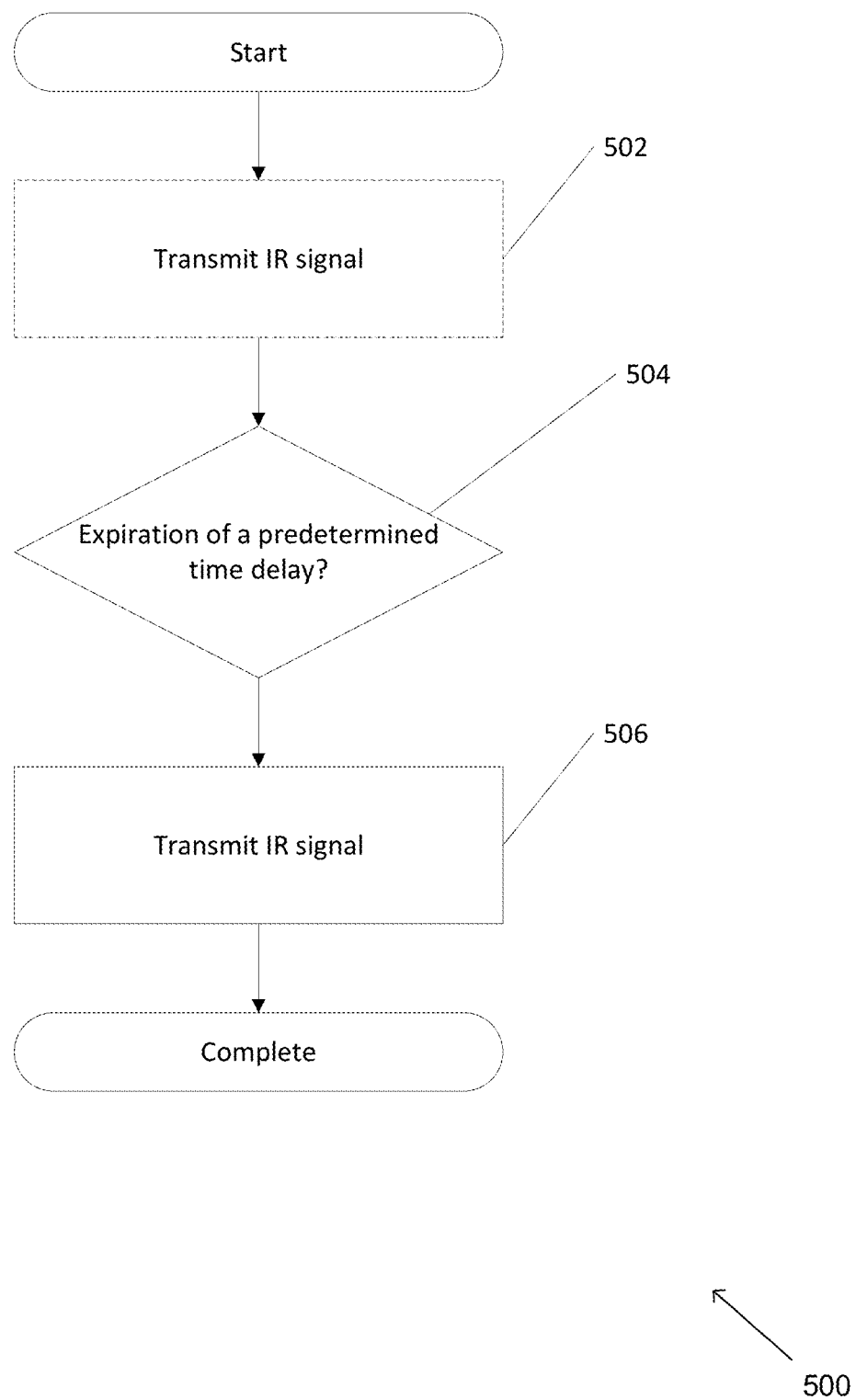
FIGS. 5A-C are flow charts illustrating embodiments of processes for transmitting an IR signal in accordance with embodiments of the invention.

A flow chart illustrating one embodiment of a process for transmitting an IR signal in accordance with an embodiment of the invention is shown in FIG. 5A. In many embodiments, the process 500 may include a predetermined time delay and/or a scheduled and/or frequency driven repeater in periodically transmitting an IR signal 226, as further described below. The process 500 may include transmitting (502) an IR signal 226 that may include ID data 228, as described above. The process 500 may also include determining (504) whether a predetermined time delay has expired. If the predetermined time delay has not expired (504), then the process 500 may pause. However, if the predetermined time delay has expired (504), then the process 500 may include transmitting (506) the IR signal 226. In many embodiments, a second IR device 118 may transmit (502, 504) the IR signal 226 using an IR transmitter 302. In some embodiments, the second IR device 118 may transmit (502, 504) the IR signal 226 as a periodic beacon (i.e., beacon signal) so that it may be recognized by a first IR device 114. In various embodiments, the IR signal 226 may provide a unique and distinguishing signal as a unique identifier for the second IR device 118. In some embodiments, the IR signal 226 may be transmitted (502, 504) using communication protocols such as (but not limited to) IrDA, TVR, and/or any other binary or analog signal type that could be uniquely coded or translated. In many embodiments, the IR transmitter 302 may be repeating, on/off, and/or processor/software driven.

Figure 5B:
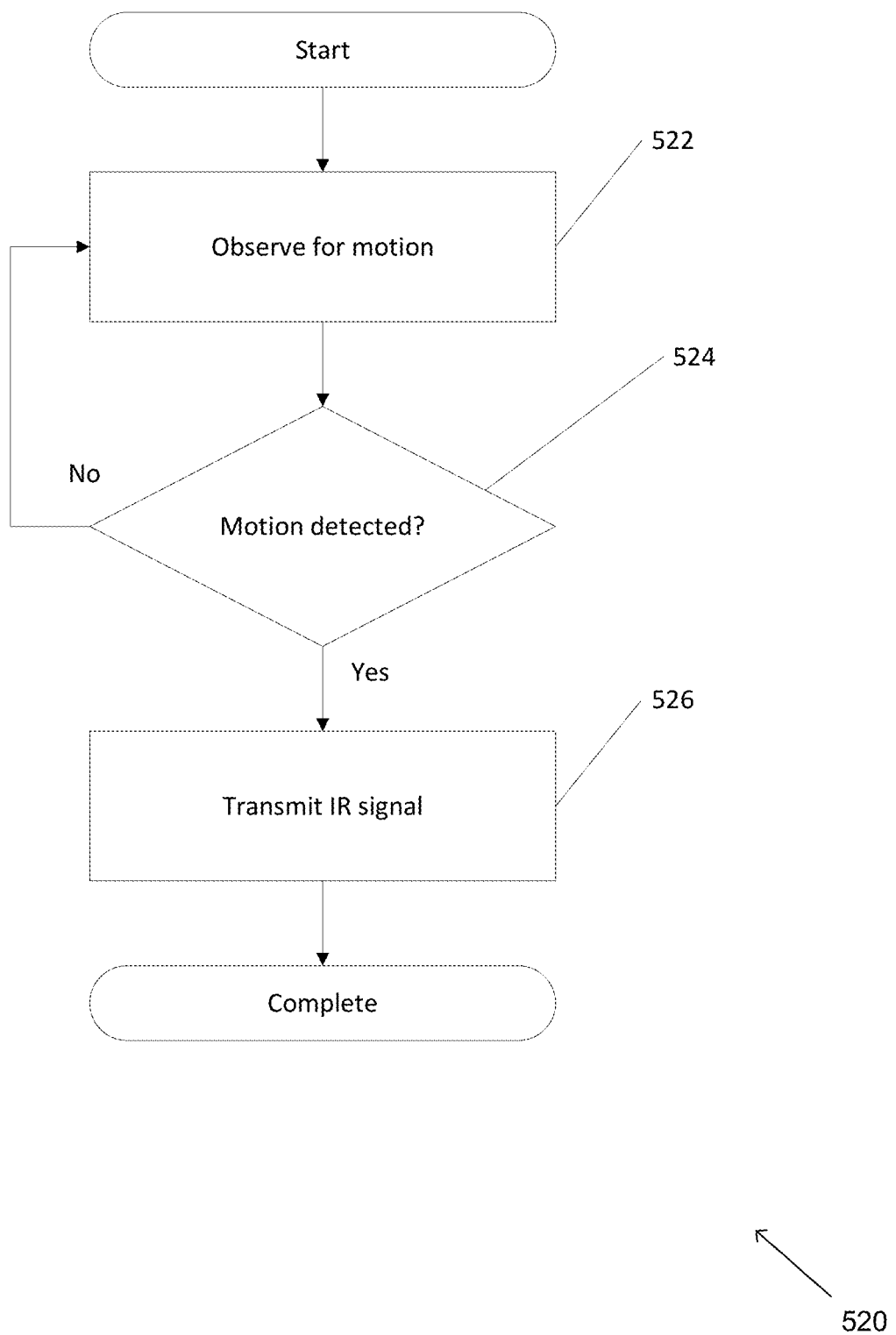

A flow chart illustrating another embodiment of a process for transmitting an IR signal in accordance with an embodiment of the invention is shown in FIG. 5B. In many embodiments, the process 520 may include observing (522) for motion. The process 520 may also include determining (524) whether a motion has been detected. If motion has not been detected (524), then the process 520 may continue to observe (522) for motion. However, if motion is detected (524), then the process 520 may include transmitting (526) the IR signal 226. In many embodiments, a second IR device 118 may observe (522) and/or transmit (526) the IR signal 226, as described herein.

Figure 5C:
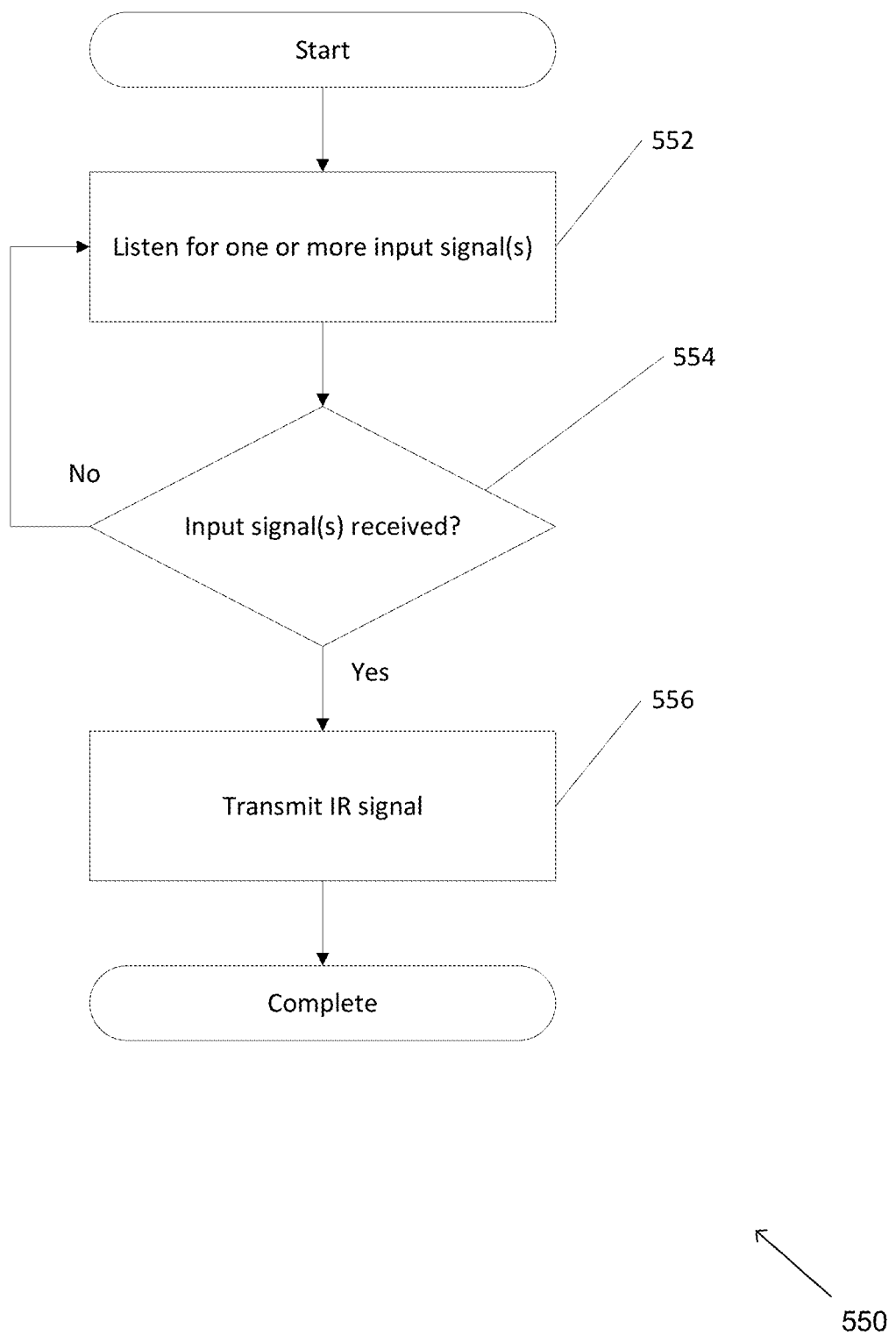

A flow chart illustrating another embodiment of a process for transmitting an IR signal in accordance with an embodiment of the invention is shown in FIG. 5C. In many embodiments, the process 550 may include listening (552) for one or more input signals. For example, a second IR device 118 may listen (552) for one or more external signal(s) and/or any other input signal(s). The process 550 may include determining (554) whether an input signal has been received. If an input signal has not been received (554), then the process 550 may continue to listen (552) for an input signal. However, if an input signal is received (554), then the process 550 may include transmitting (556) the IR signal 226. In many embodiments, a second IR device 118 may listen (552) for the one or more input signal(s) and/or transmit (556) the IR signal 226, as described herein.

In reference to FIGS. 5A-C, in some embodiments, the second IR device 118 may be integrally formed or formed separately with an object for locating, tracking, validating, and/or communicating with the object, as further described below. In some embodiments, the object may be an inanimate object, such as (but not limited to) a UAV (e.g., drone), cargo container, package, vehicle, robot, automotive equipment, etc. However, in other embodiments, the object may be an animate object, such as a person or an animal. In some embodiments, the second IR device 118 may be secured to an object by placement and/or attachment to an object, as further described below. In some embodiments, the second IR device may be secured directly to the object using any attaching mechanism. For example, the second IR device 118 may be secured to an object using an adhesive, a strap, a clip, magnets, glue, etc. In other embodiments, the second IR device may be secured to an object by placing the second IR device on an object or on an item that is attached to and/or covering an object.

In further reference to FIGS. 5A-C, the ID data 228 may be a unique identifier that may be associated with the second IR device 118. In some embodiments, the ID data 228 may be assigned based on an object that the second IR device 118 is secured to. For example, the second IR device 118 and the object may be in wired or wireless communication wherein the second IR device 118 may define the ID data 228 based on capturing and/or receiving information from the object. In some embodiments, the ID data 228 may be assigned by an associated client device (e.g., a smart-phone) or server 106 or any other device having access and/or permissions to the second IR device 118. In some embodiments, the ID data 228 may be directly assigned by a user using the second IR device 118. In some embodiments, the ID data 228 may be randomly generated by any device in the IR communication system 100 so long as the ID data 228 is at least distinguishable by the first IR device 114. In further reference to FIGS. 5A-C, the second IR device 118 may transmit the IR signal 226 using a variety of modulation techniques and/or processes known to one of ordinary skill in the art.

Figure 6:
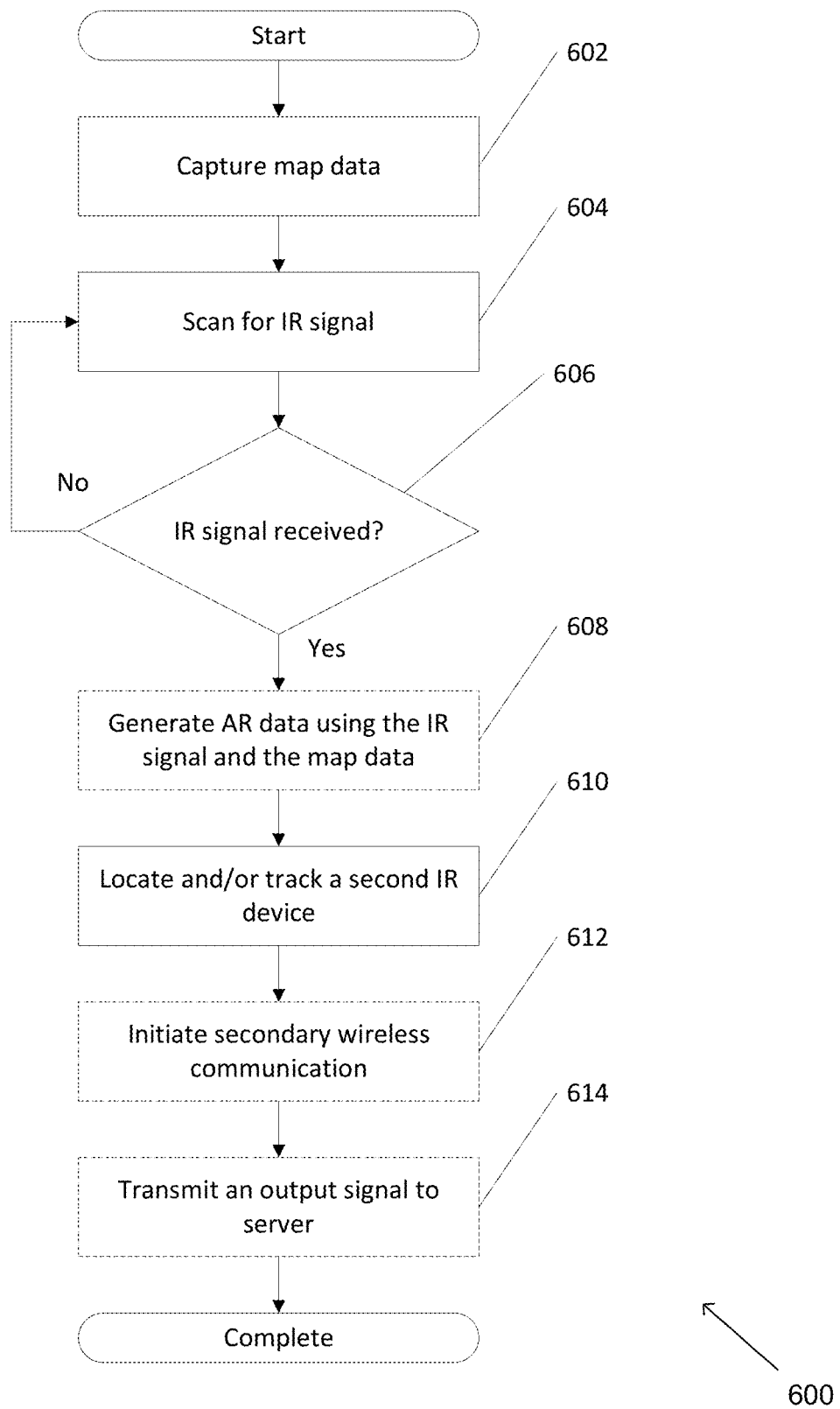
FIG. 6 is a flow chart illustrating one embodiment of a process for locating and/or tracking second IR device(s) using an IR signal in accordance with an embodiment of the invention.

A flow chart illustrating one embodiment of a process for locating and/or tracking second IR device(s) using an IR signal in accordance with an embodiment of the invention is shown in FIG. 6. As described above, a first IR device 114 may be capable of scanning for and receiving IR signal(s) 226 and processing and/or filtering the IR signal 226 to determine whether the IR signal 226 includes information for identification of a second IR device 118. In many embodiments, the first IR device 114 may be configured to detect IR signal(s) 226 and determine distance, location, and/or integrate IR data 226 (or data generated using the IR data 226) into 3D and/or 2D map data.

In reference to FIG. 6, the process 600 may include capturing map data 224 using the mapping module 202. As described above, the first IR device 114 may include a mapping module 202. In many embodiments, the mapping module may be capable of 3D scanning (may also be referred to as "mapping") and/or 2D scanning. For example, the mapping module 2020 may include a Light Detection and Ranging (LIDAR) device, IR device, Laser device, Light Detector (e.g., camera(s)), and/or any other detector(s), or array of detector(s) or technology that may be capable of scanning and distinguishing IR. Thus, the first IR device 114 may be configured to capture (602) map data 224 using a variety of technologies such as (but not limited to) ultrasonic, IR, Laser, LIDAR, Time of Flight (TOF), etc.

In further reference to FIG. 6, the process 600 may also include scanning (604) for an IR signal. In many embodiments, the first IR device 114 may scan (604) for an IR signal 226 using an IR receiver 204. As described above, a second IR device 118 may include an IR transmitter 302 for transmitting an IR signal 226. The process 600 may also include determining (606) whether the IR signal 226 has been received. If the IR signal 226 has not been received (606), then the process 600 may continue to scan (604) for an IR signal 226 from the second IR device 118. In many embodiments, the first IR device 114 may be configured to utilize a variety of demodulation techniques as appropriate to receive (and process) the IR signal 226. In further reference to FIG. 6, if the IR signal 226 has been received (606), then the process 600 may include generating (608) AR data 234 using the IR signal 226 and the map data 224. In many embodiments, the AR data 234 may be generated (608) using processes known to one of ordinary skill in the art. For example, the IR signal 226 may be used to locate the second IR device 118 and the location of the second IR device 118 (and/or a representation of the location of the second IR device 118) may be superimposed onto the map data 224. Further, the IR signal 226 may be used to track the movement (and/or the projected movement) of the second IR device 118 as motion data 232, and the motion data 232 may be part of or generated using the AR data 234.

In further reference to FIG. 6, the process 600 may include locating and/or tracking (610) the second IR device 118. In some embodiments, the first IR device 114 may locate and/or track (610) the second IR device 118 using the AR data 234. In such embodiments, the movement of the second IR device 118 may be represented on a coordinate system. In other embodiments, the first IR device 114 may locate and/or track (610) the second IR device 118 using the IR signal 226 with or without the map data 224. For example, the first IR device 114 may locate and track (610) the second IR device 118 based on receiving a plurality of IR signals 226, spread apart in time, from the second IR device 118. In some embodiments, the first IR device 114 may be trained using artificial intelligence processes for predicting movement of a second IR device 118. For example, a first IR device 114 may repeatedly perform process 600 and "learn" to predict with varying levels of confidence a location of the second IR device 118. In addition, the process 600 may also include initiating (612) secondary wireless communications between the first IR device 114, first secondary device 115, second IR device 118, second secondary device 119, as described above. In some embodiments, the process 600 may also include transmitting an output signal 236 to a server 106. The output signal 236 may comprise a variety of information including (but not limited to) the AR data 234, location data 230, motion data 323, map data 224, and/or IR signal 226. In many embodiments, the process 600 may be performed by the first IR device 114.

Figure 7:
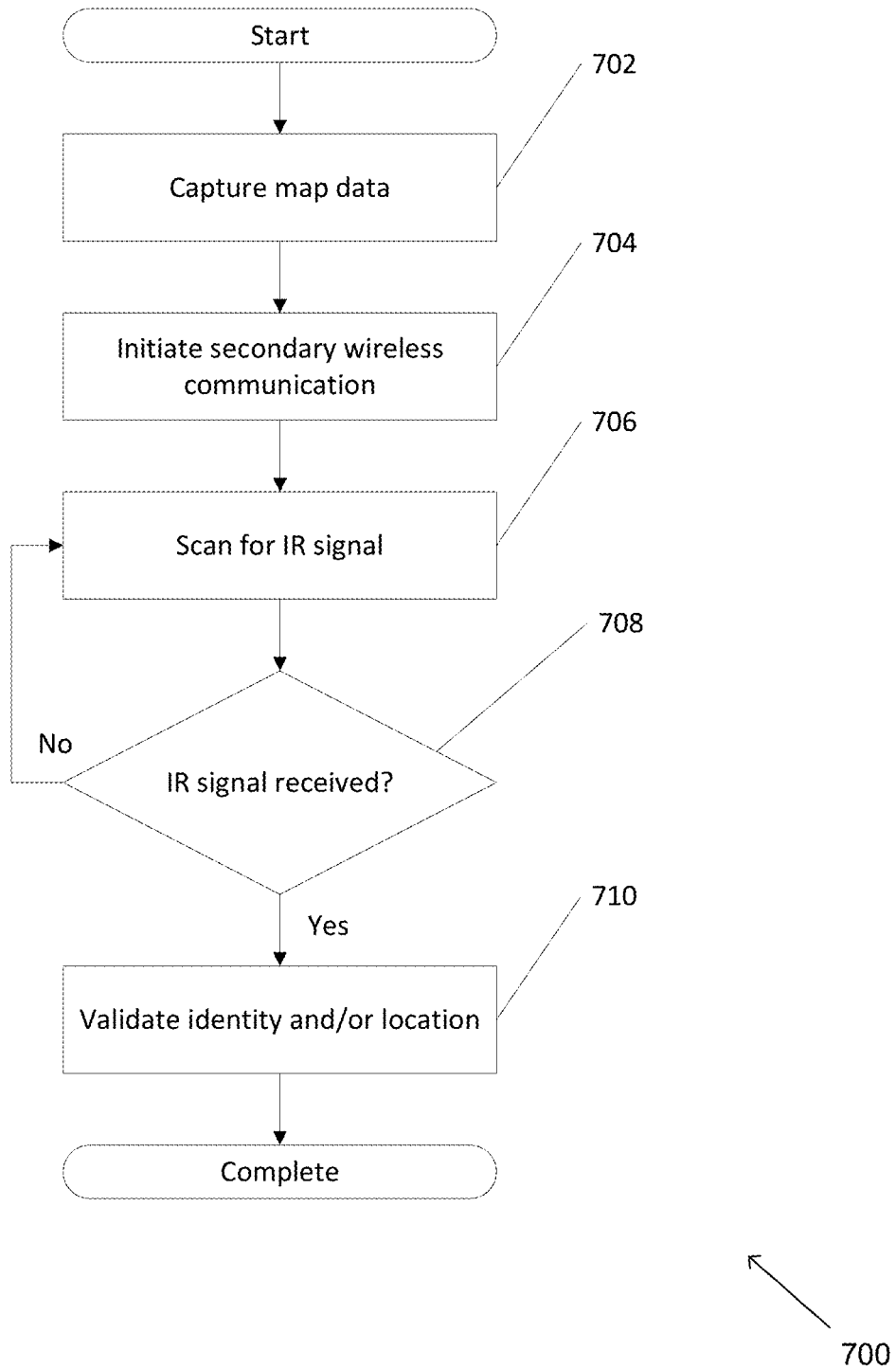
FIG. 7 is a flow chart illustrating one embodiment of a process for validating identity and/or location using an IR signal in accordance with an embodiment of the invention.

A flow chart illustrating one embodiment of a process for validating identity and/or location using an IR signal in accordance with an embodiment of the invention is shown in FIG. 7. In some embodiments, the first IR device 114 and the second IR device 118 may be located within a predetermined proximity to each other, and the first IR device 114 may be configured to validate the second IR device 118 including (but not limited to) the second IR device's identity and/or location using an IR signal 226. In some embodiments, such validation using the IR signal 226 may occur after the first IR device 114 is in wireless communication with the second IR device 118 using one or more wireless protocols instead of via IR communications.

In reference to FIG. 7, the process 700 may include capturing (702) map data 224, as described above. The process 700 may also include initiating (704) secondary wireless communication by the first IR device 114. For example, the first IR device 114 may initiate (704) communication via one or more wireless communications protocols known to one of ordinary skill in the art. In many embodiments, the process 700 may include scanning (706) for an IR signal 226, as further described above. In addition, the process may also include determining (708) whether an IR signal 226 has been received, as further described above. If it is determined (708) that the IR signal 226 has not been received, then the process 700 may continue to scan (706) for the IR signal 226. However, if it is determined (708) that the IR signal 226 has been received, then the process 700 may validate the identity and/or location (710) of a second IR device 118 that transmitted the IR signal 226. In some embodiments, validation (710) using the IR signal 226 may trigger various further actions and/or tasks. For example, the first IR device 114 may instruct the second IR device 118 to finish a final 100 yards or less of navigation and orienting to initiate some task. In some embodiments, the first and/or second IR devices 114, 118 may automatically perform actions and/or tasks based on the validation (710). In many embodiments, the process 700 may be performed by the first IR device 114.

Although processes using IR communication systems are discussed above with respect to FIGS. 5-7, any of a variety of processes using IR communications systems including a variety of processes utilizing first IR devices, second IR devices, client devices, secondary devices, and servers communicating using various communication protocols as appropriate to the requirements of a specific application can be utilized in accordance with embodiments of the invention. Exemplary communication systems with IR devices in accordance with embodiments of the invention are discussed further below.

Exemplary IR Communication Systems

Figure 8:
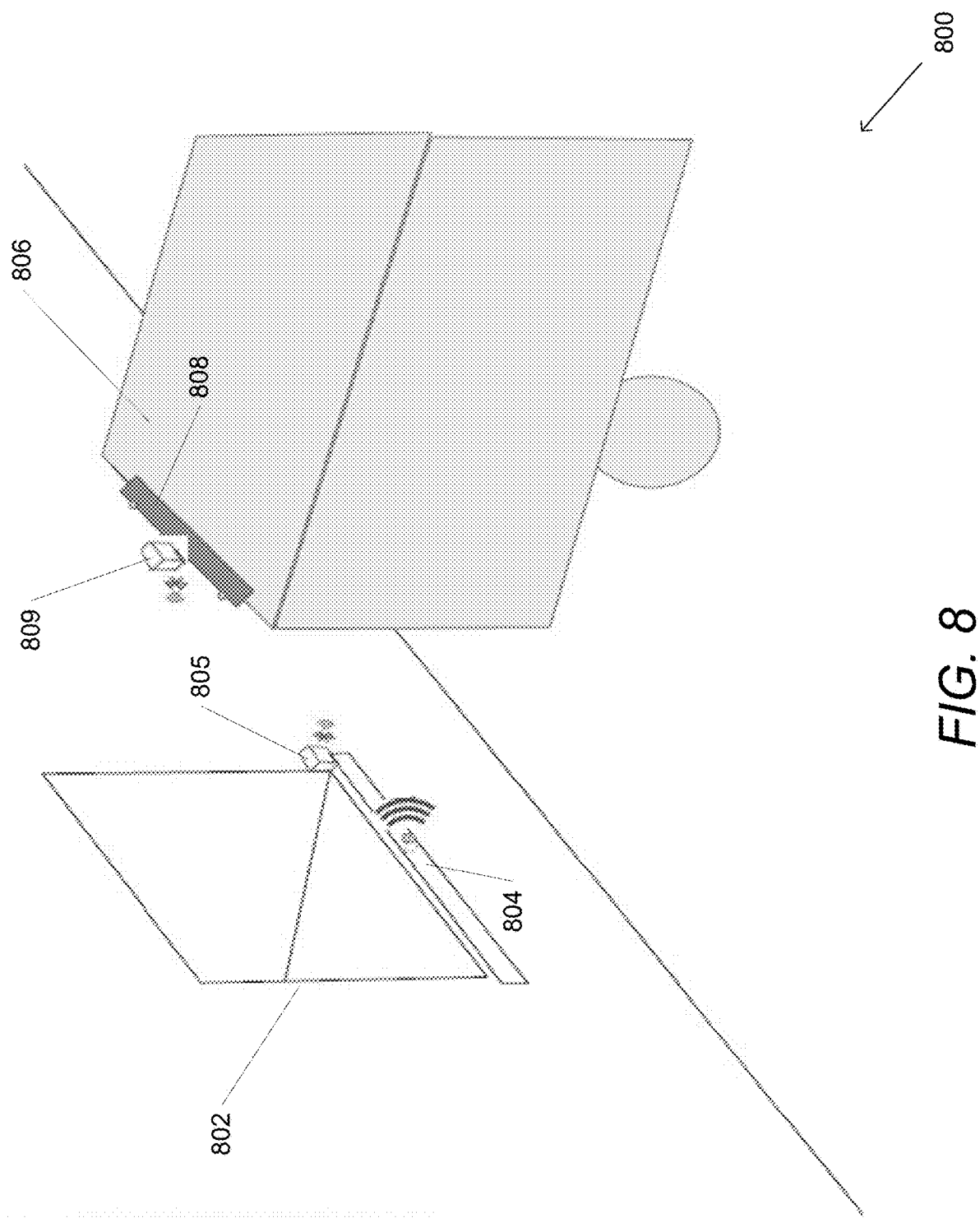
FIG. 8 is a schematic diagram illustrating one embodiment of an IR communication system in accordance with an embodiment of the invention.

In many systems, validation may be important. For example, IR validation may assist in driver-less vehicles and/or robot systems or the like. In such embodiments, IR validation may open communications including (but not limited to) task status, confirmation of orientation on physical engagement, etc. A schematic diagram illustrating one embodiment of an IR communication system in accordance with an embodiment of the invention is shown in FIG. 8. In many embodiments, first and second IR devices may aid a vehicle's backup system using IR signal(s) to successfully park and/or dock. The IR communication system 800 may include a freight dock 802 (may also be referred to as a "dock") having a first IR device 804 and a freight truck 806 (may also be referred to as a "truck") having a second IR device 808. In some embodiments, the dock 802 may also include a first secondary communication device 805 (e.g., a Bluetooth enabled device). In some embodiments, the truck 806 may be equipped with a second secondary communication device 809 (e.g., a Bluetooth enabled device). In many embodiments, the freight truck 806 may back into the freight dock 802. While the truck 806 has navigated to a real place, the truck 806 may be directed to the first IR device 804 giving that dock 802 a unique identifier with a known location (e.g., address, GPS coordinates, etc.). The truck 806 may move to the location of the dock 802 under its own means, but when the truck 806 comes into line of sight range of the dock 802, the first and second IR devices 804, 808 (and/or the first and second secondary communication devices 805, 809) may connect and begin to assist the truck's technology in the backup maneuver. Although illustrated as separate devices, in some embodiments, the first and second secondary communication devices 805, 809 may be integrally formed as components of the first and second IR devices 804, 808, respectively. In some embodiments, the dock 802 and the truck 806 may communicate using a secondary wireless communication protocol(s). In various embodiments, the dock 802 and the truck 806 may communicate using IR signal(s) via the first and second IR devices 804, 808 using one or more processes, as described above.

In reference to FIG. 8, the truck 806 may utilize driverless technology or driver aided technology. In some embodiments, the dock 802 may include a bump sensor. In some embodiments, the truck 806 may include a bump sensor. In various embodiments, the truck 806 (and/or the second IR device 808) may receive confirmation via a secondary wireless communication protocol (e.g., Bluetooth) or IR transmission once bump sensor is activated. In many embodiments, the dock 802 may communicate with one or more client devices, servers, etc., that a specific truck 806 has docked at a specific dock 802, battery levels, etc. Further, the truck 806 may communicate with one or more client devices, servers, etc., that the truck 806 has successfully docked, completed load, amount of load remaining, etc.

Figure 9:
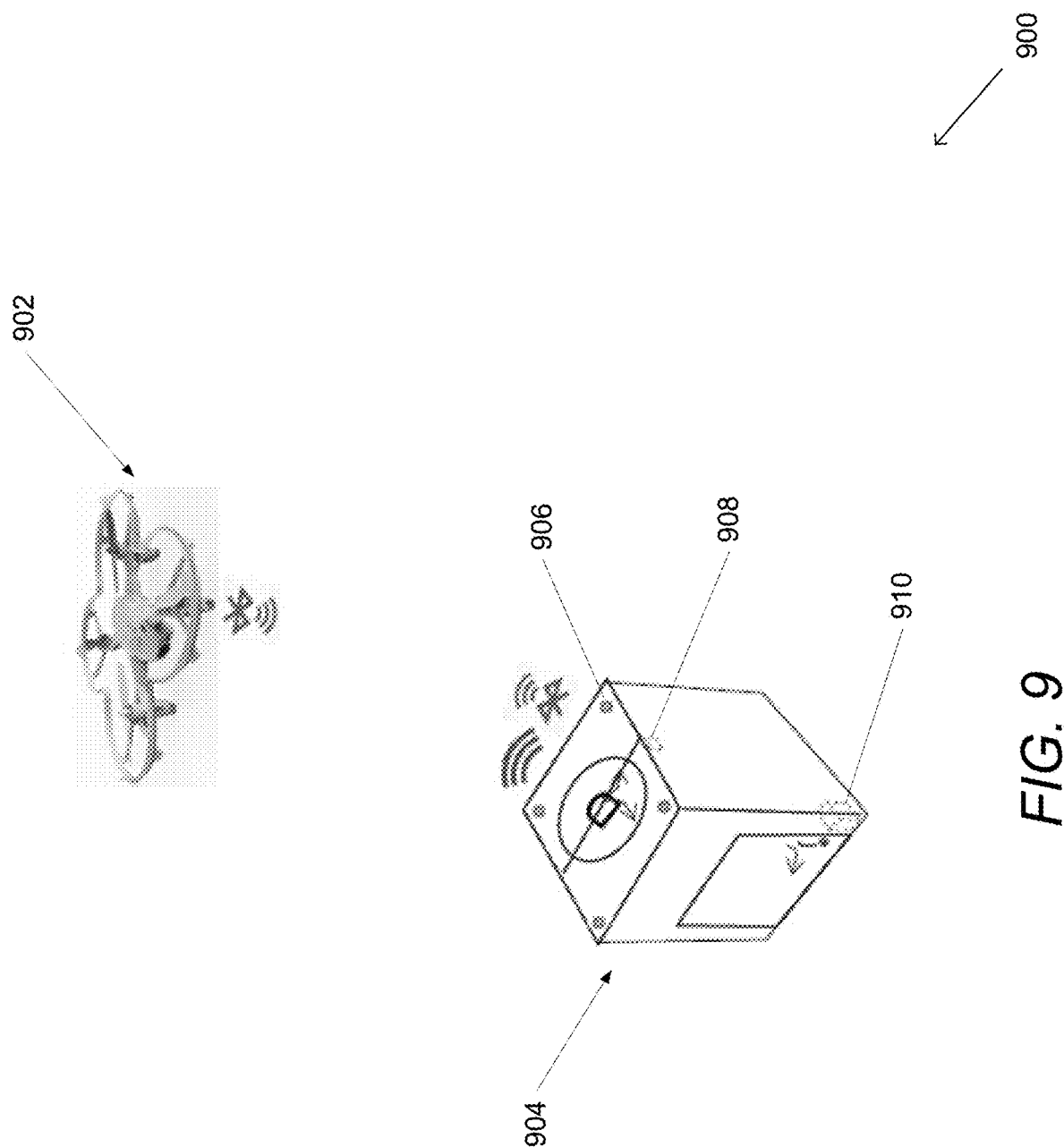
FIG. 9 is a schematic diagram illustrating another embodiment of an IR communication system in accordance with an embodiment of the invention.

A schematic diagram illustrating another embodiment of an IR communication system in accordance with an embodiment of the invention is FIG. 9. In various embodiments, first and second IR devices may be components of a drone package delivery system 900. In many embodiments, the drone package delivery system 900 may include a package delivery drone 902 (may also be referred to as a "drone") and a landing receptacle 904 (may also be referred to as a "receptacle"). In various embodiments, the drone 902 may include a second IR device (not illustrated) for IR communications, as described above. In some embodiments, the drone 902 may also include contactless distance measurement emitters and/or collectors. In some embodiments, the drone 902 may also include a secondary wireless communication device capable of communications beyond IR (e.g., Bluetooth), as described above. In various embodiments, the secondary wireless communication device may be used to confirm orientation, distance, and/or communicate with the receptacle 904. In many embodiments, the drone 902 may utilize imaging techniques to navigate to a location, physical address, GPS coordinate, specific to a receptacle 904. Once in range of the secondary wireless communication (e.g., Bluetooth) and along with the contactless distance measurement protocols, the drone 902 may further orientate and land on the receptacle 904. In various embodiments, the drone package delivery system 900 may integrate features to receive a package and keep it locked and/or protected until a user takes the package.

In reference to FIG. 9, the receptacle 904 may include a first IR device 910 to perform various processes, as described above. In various embodiments, the receptacle 904 may integrate the functionality and communication between the drone 902 and the receptacle 904. In many embodiments, the receptacle 904 may also include various technologies including (but not limited to) secondary wireless communication and image processing capabilities. In many embodiments, the receptacle 904 may include a power system to open door(s) and store content. In some embodiments, the package may be accessed with a key and/or a wireless controlled lock (e.g., Bluetooth controlled) to obtain the package from the receptacle 904. In some embodiments, the receptacle 904 may include a level detector to indicate when a package has been received. Further, the receptacle 904 may also include a drainable face and/or seal for weather and draining considerations. In some embodiments, the receptacle 904 may include one or more distinctive markings 906 for correct orientation. In some embodiments, the receptacle 904 may also include a push, touch, and/or contact weight sensor(s) 908. In various embodiments, the drone 902 having a second IR device and the receptacle 904 having a first IR device 910 may communicate using IR signal(s) by utilizing one or more processes, as described above.

Figure 10:
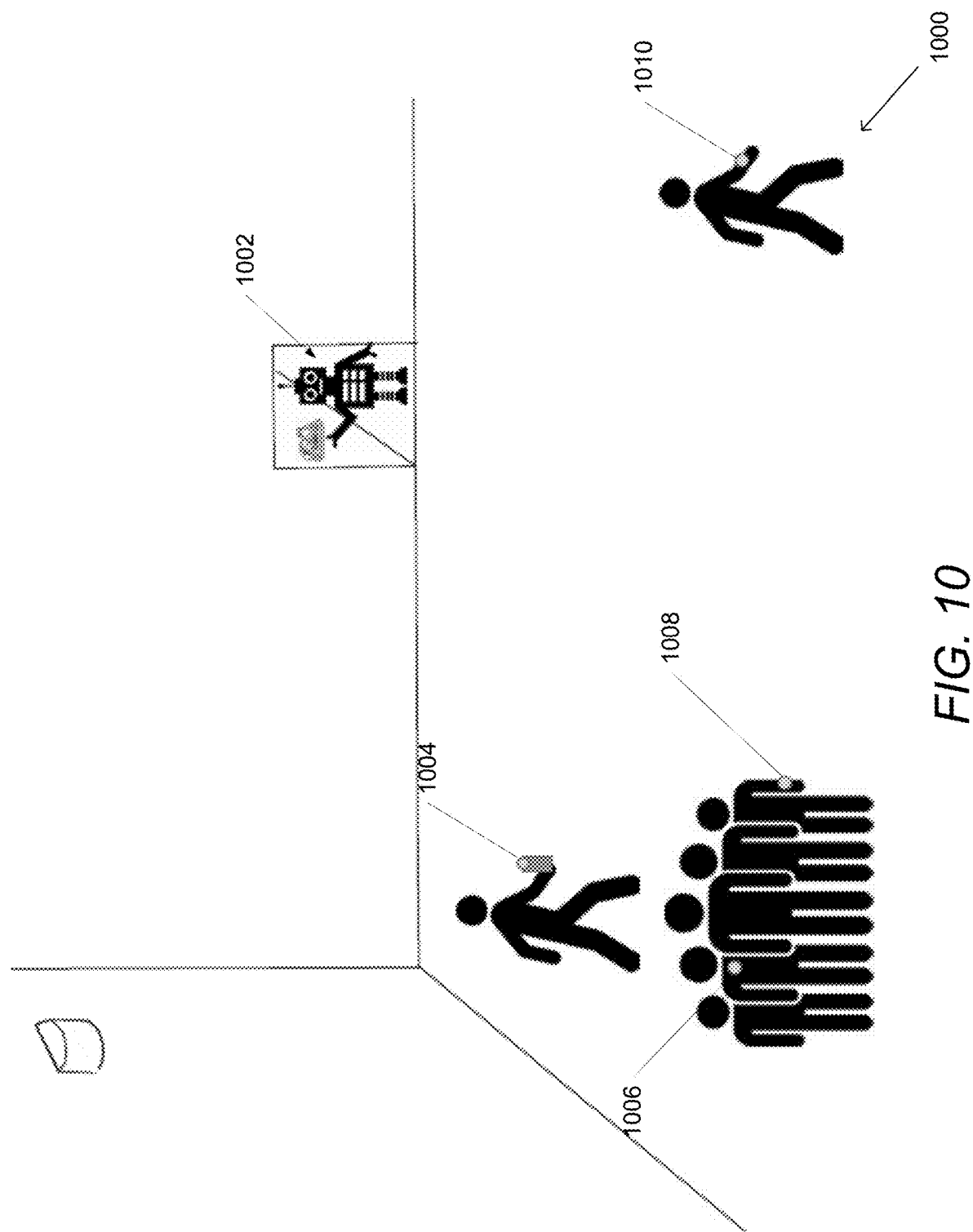
FIG. 10 is a schematic diagram illustrating another embodiment of an IR communication system in accordance with an embodiment of the invention.

A schematic diagram illustrating another embodiment of an IR communication system in accordance with an embodiment of the invention is shown in FIG. 10. The IR system 1000 may include a first IR device 1002 (attached or part of a delivery robot) that may survey a location and receive one or more IR signals in a space (e.g., a restaurant, a facility, etc.). In some embodiments, the first IR device 1002 may be in an advantageous surveying location for picking up the one or more IR signals. In many embodiments, second IR devices 1004, 1006, 1008, 1010 may be located throughout the space. In various embodiments, each of the second IR devices 1004, 1006, 1008, 1010 may transmit an IR signal, as further described above. In some embodiments, one or more of the second IR devices 1004, 1006, 1008, 1010 may communicate with a separate device (e.g., a delivery robot) that may be mobile and capable of delivery.

In reference to FIG. 10, the IR communication system 1000 may be a delivery system. In some embodiments, this delivery system may also be configured to allow for navigation of IR devices inside and/or outside of LOS. In some embodiments, the delivery system may operate by an onboard guidance system. In some embodiments, the delivery system may be configured for communication about location of potentially moving delivery points via a wearable device of a user. In many embodiments, the delivery robot may verify that a delivery was confirmed, delivery was made to the correct person, etc. In many embodiments, the delivery robot having a first IR device 1002 and the one or more second IR devices 1004, 1006, 1008, 1010 may communicate using IR signal(s) by utilizing one or more processes, as described above.

Figure 11:
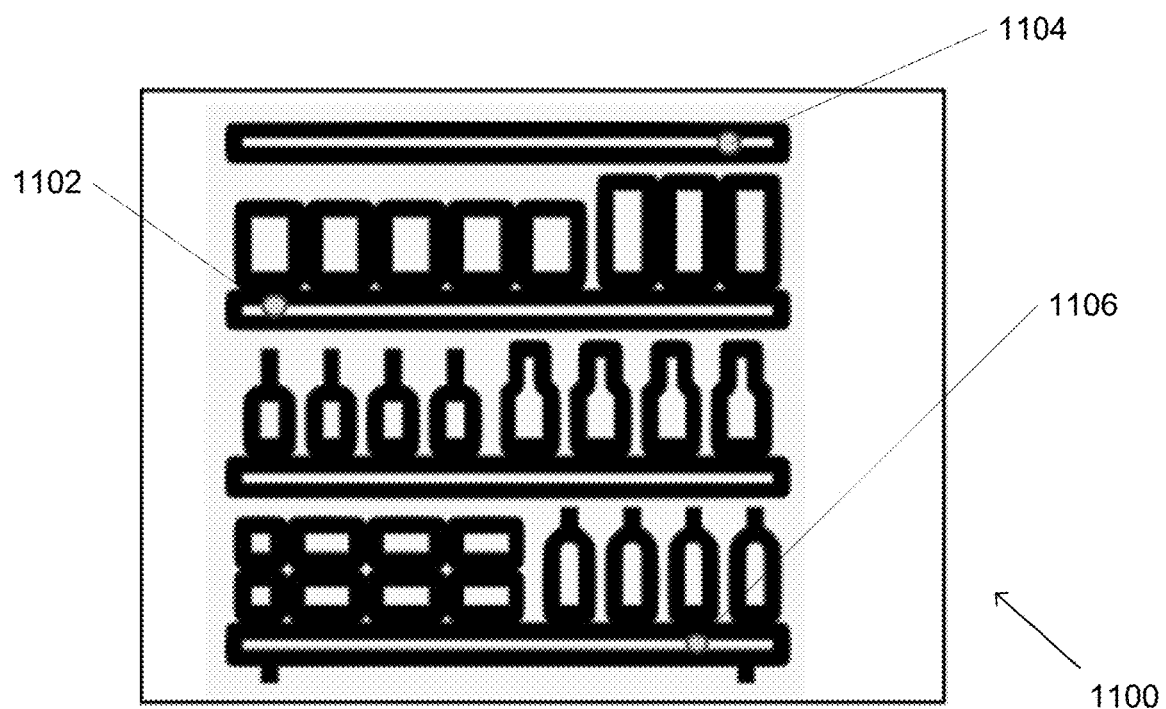
FIG. 11 is a schematic diagram illustrating another embodiment of an IR communication system in accordance with an embodiment of the invention.
Figure 11:
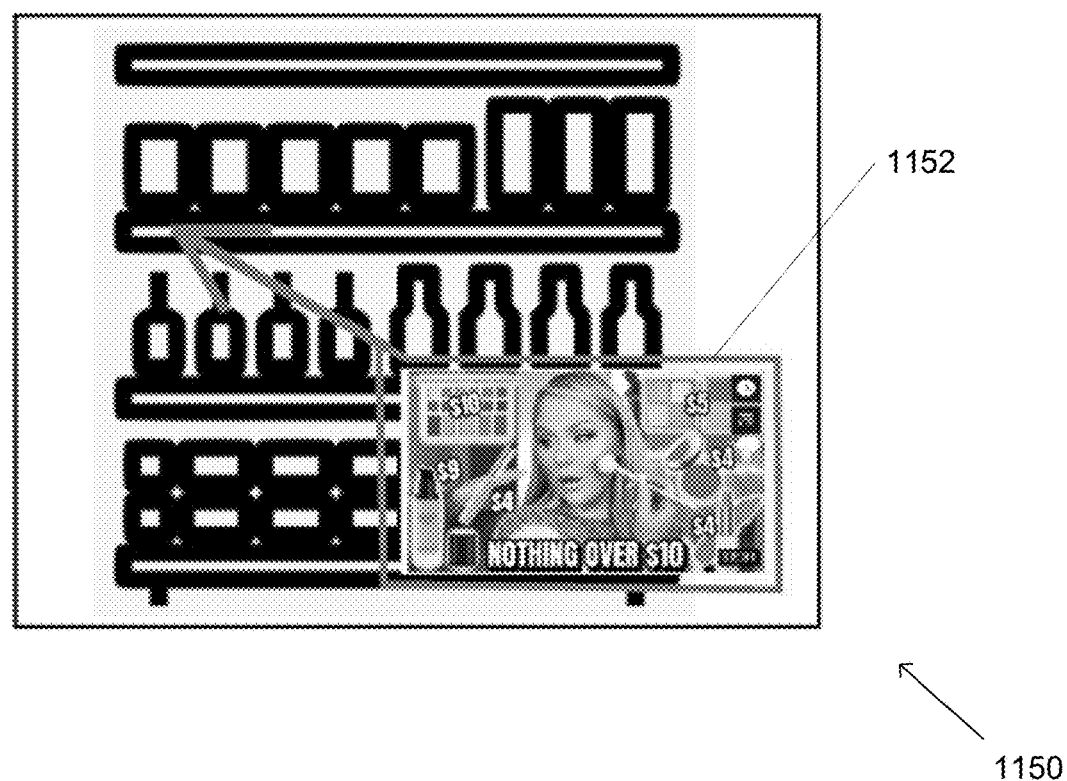

A schematic diagram illustrating another embodiment of an IR communication system in accordance with an embodiment of the invention is shown in FIG. 11. The system may include an initial state 1100 having one or more second IR devices 1102, 1104, 1106. For example, a shelf of goods (or a sign, a way point, etc.) may include one or more second IR devices 1102, 1104, 1106 each having an IR transmitter, as further described above. In some embodiments, a first IR device may be configured to receive the one or more IR signals transmitted by the second IR devices 1102, 1104, 1106, as further described above. In some embodiments, the first IR device may be incorporated into a variety of devices such as AR goggles. By viewing with such compatible AR goggles, the IR signal(s) may be selected and converted to consumable information such as (but not limited to) imagery, advertisement, audio/video clips, linking the user to a website, providing additional information, etc. The IR system may further include a selected state 1150 after a user has selected one or more of the IR signals. For example, a user may select the second IR device 1102 (and/or the IR signal corresponding to the second IR device 1102), and thus the user may be provided with additional information 1152. In various embodiments, the first IR device and the one or more second IR devices 1102, 1104, 1106 may communicate using IR signal(s) by utilizing one or more processes, as described above.

Figure 12:
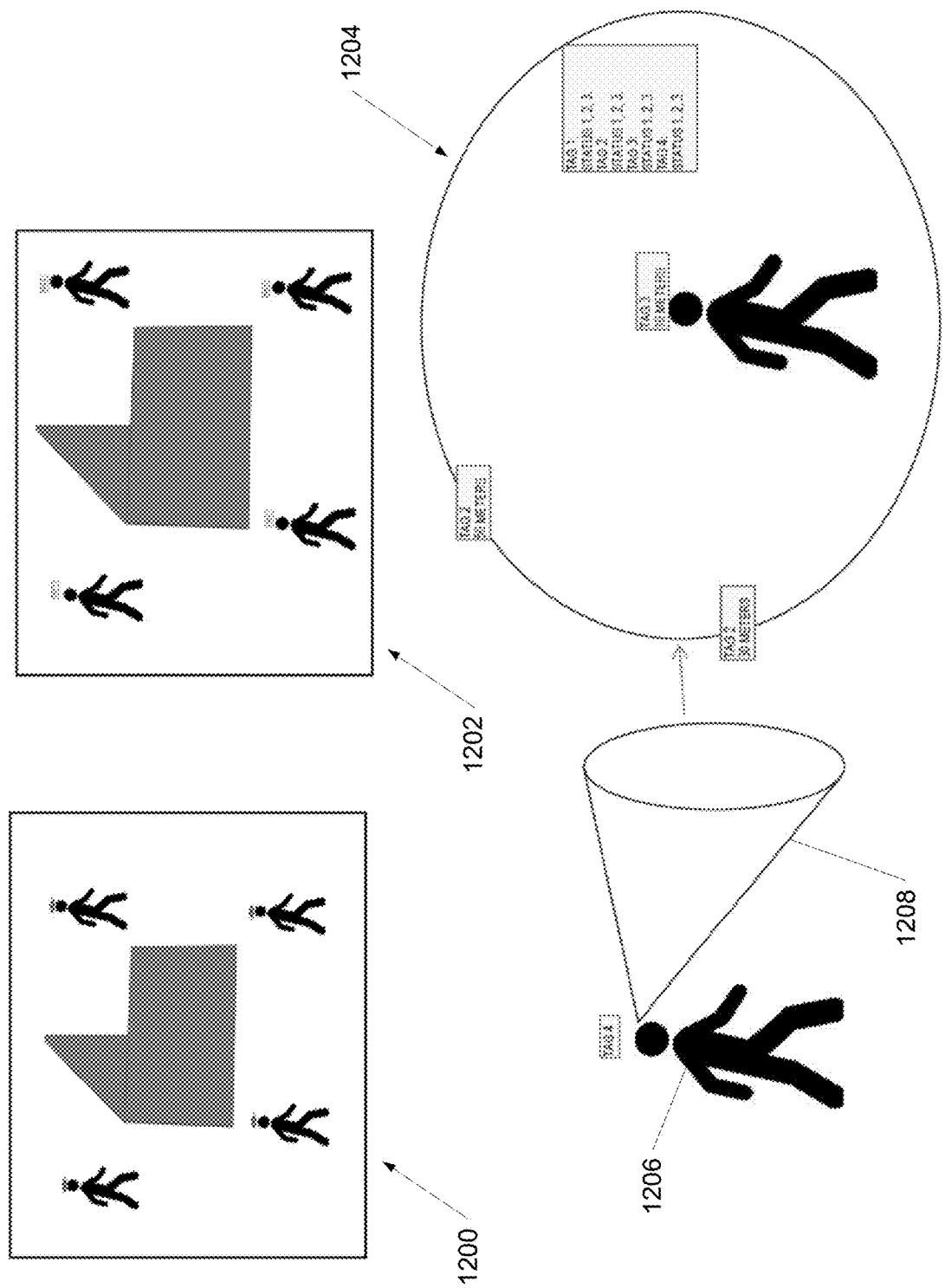
FIG. 12 is a schematic diagram illustrating another embodiment of an IR communication system in accordance with an embodiment of the invention.

A schematic diagram illustrating another embodiment of an IR communication system in accordance with an embodiment of the invention is shown in FIG. 12. FIG. 12 illustrates a real view 1200 with LOS obstacles, augmented aerial view 1202 with tags applied to the view. The IR communication may be utilized to bring video games, and the like, to real life. In many embodiments, the various users may wear IR transmitter/receiver tags (e.g., first and/or second IR devices) and AR headsets. For example, an individual user 1206 may have a field of view 1208 having an AR view 1204. In such embodiments, the various user(s) may confirm location and/or identity using non-visible IR signals transmitted by the tags, such that at least one other user may view them.

Figure 13:
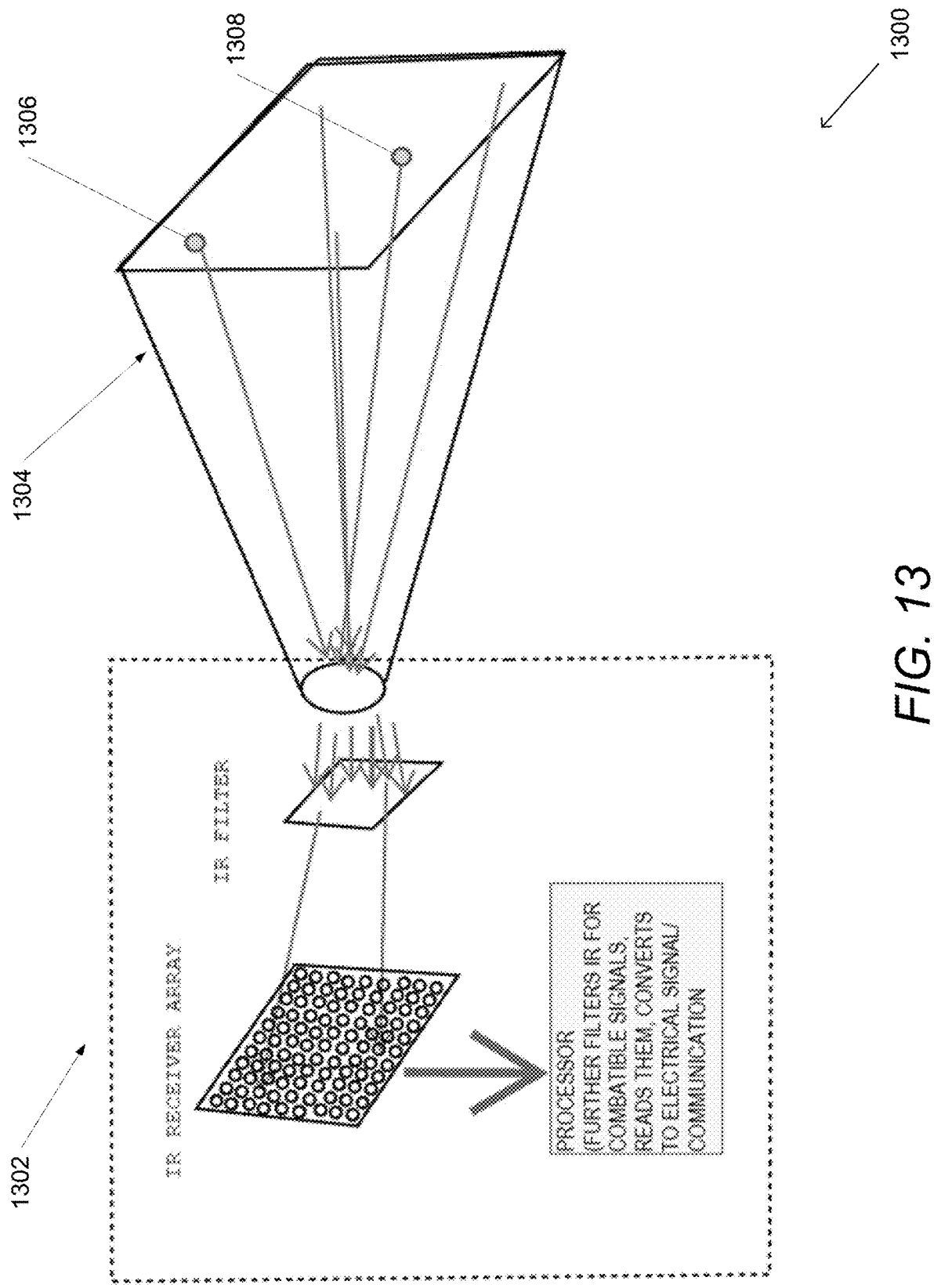
FIG. 13 is a schematic diagram illustrating another embodiment of an IR communication system in accordance with an embodiment of the invention.

A schematic diagram illustrating another embodiment of an IR communication system in accordance with an embodiment of the invention is shown in FIG. 13. The IR communication system 1300 may include an IR device 1302 (may also be referred to as a "first IR device") having an IR receiver array and an IR filter. In many embodiments, the first IR device 1302 may also include one or more processors for various functions including (but not limited to) filtering IR for compatible signals, reading IR, converting to electrical signals, etc. In many embodiments, the IR device 1302 may have a field of view where various light, visible or non-visible, transmits to a lens of the IR device 1302. For example, transmitting IR devices 1306, 1308 (may also be referred to as "second IR devices") are illustrated.

Although exemplary IR communication systems are discussed above with respect to FIGS. 8-13, any of a variety of IR communications systems including a variety of systems utilizing first IR devices, second IR devices, client devices, secondary devices, and/or servers communicating using various communication protocols as appropriate to the requirements of a specific application can be utilized in accordance with embodiments of the invention. While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A first infrared (IR) device configured for real time mapping, the first IR device comprising:
   a mapping module having a field of view;
   a communication module;
   an IR receiver configured to receive an IR signal transmitted from at least one second IR device;
   a processor operatively connected to the mapping module, the communication module, and the IR receiver; and
   memory storing a program comprising instructions that, when executed by the processor, cause the first IR device to:
      capture map data of the field of view using the mapping module;
      transmit a request for a requested IR signal using the communication module;
      scan using the IR receiver;
      receive the IR signal, from the at least one second IR device, using the IR receiver; and
      validate the at least one second IR device to a location by mapping the IR signal to a position on the map data.

2. The first IR device of claim 1, wherein the program comprises further instructions that, when executed by the processor, further cause the first IR device to scan within a predetermined response time window.

3. The first IR device of claim 1, wherein the program comprises further instructions that, when executed by the processor, further cause the first IR device to validate the at least one second IR device to a location by comparing the IR signal for a match of the requested IR signal.

4. The first IR device of claim 1, wherein the request for the requested IR signal comprises a unique identifier that identifies the at least one second IR device.

5. The first IR device of claim 1, wherein the program comprises further instructions that, when executed by the processor, further cause the first IR device to determine the at least one second IR device's orientation and speed using the map data and the IR signal.

6. The first IR device of claim 1, wherein the program comprises further instructions that, when executed by the processor, further cause the first IR device to use GPS data to further refine the map data.

7. The first IR device of claim 1, wherein the program comprises further instructions that, when executed by the processor, further cause the first IR device to initiate secondary wireless communication with the at least one second IR device using the communication module.

8. The first IR device of claim 1, wherein the program comprises further instructions that, when executed by the processor, further cause the first IR device to transmit the map data to a server.

9. The first IR device of claim 1, wherein the program comprises further instructions that, when executed by the processor, further cause the first IR device to generate augmented reality (AR) data using the IR signal and the map data, wherein the AR data indicates a location of the at least one second IR device in relationship to the map data.

10. The first IR device of claim 1, wherein the mapping module comprises a camera and the mapping data comprises 2D image data.

11. The first IR device of claim 1, wherein the mapping module comprises a Light Detection and Ranging (LIDAR) device and the mapping data comprises 3D data.

12. A system for infrared (IR) communications, the system comprising:
   a first IR device comprising a mapping module and an IR receiver, wherein the first IR device is configured to:
      capture map data of a field of view using the mapping module;
      receive an IR signal within a line of sight (LOS);
      associate the IR signal to a location on the LOS and map the location of the IR signal on to the map data;
      scan for and receive compatible IR signals and generate augmented reality (AR) data using the compatible IR signals and the map data, wherein the compatible IR signals comprise data that is compatible for use by the first IR device; and
   at least one second IR device comprising an IR transmitter, wherein the at least one second IR device is configured to transmit the IR signal using the IR transmitter.

13. The system for IR communications of claim 12, wherein the first IR device and the at least one second IR device each further comprises a communication module for wireless communication between the first IR device and the at least one second IR device.

14. The system of IR communications of claim 13, wherein the second IR device is configured to transmit location data to the first IR device using the communication module.

15. The system for IR communications of claim 13, wherein the first IR device is configured to transmit, using the communication module, a request for a requested IR signal, to the at least one second IR device and receive, using the IR receiver, the IR signal from the at least one second IR device.

16. The system of IR communication of claim 15, wherein the first IR device is configured to validate the at least one second IR device to a location by mapping the IR signal to a position on the map data and comparing the IR signal for a match of the requested IR signal.

17. The system for IR communications of claim 15, wherein the IR signal comprises a unique identifier that identifies the at least one second IR device.

18. The system for IR communications of claim 17, wherein the first IR device and the at least one second IR device each further comprises a communication module for secondary wireless communication and the first IR device transmits navigation instructions to the at least one second IR device using the secondary wireless communication.

19. The system for IR communications of claim 12, wherein the first IR device is configured to convert the IR signal to consumable information.

20. The system for IR communications of claim 12, wherein the at least one second IR device comprises a camera configured to capture camera data and the at least one second IR device is configured to filter the camera data to isolate a requested IR signals.

21. The system for IR communications of claim 12, wherein the at least one second IR device comprises a 3D imaging device and the at least one second IR device is configured to determine a location of the first IR device in 3D space.

22. The system for IR communications of claim 12, wherein the at least one second IR device comprises an IR receiver array, and the at least one second IR device is configured to receive a requested IR signal and associate the requested IR signal to a location, wherein each IR receiver of the IR receiver array correlates to a location on a field of view of the at least one second IR device.

* * * * *